United States Patent
Lin et al.

(10) Patent No.: US 11,983,628 B2
(45) Date of Patent: May 14, 2024

(54) ATTRIBUTE CONTROL TECHNIQUES FOR IMAGE EDITING

(71) Applicant: Adobe Inc., San Jose, CA (US)

(72) Inventors: Wei-An Lin, San Jose, CA (US); Baldo Faieta, San Francisco, CA (US); Cameron Smith, Santa Cruz, CA (US); Elya Shechtman, Seattle, WA (US); Jingwan Lu, Santa Clara, CA (US); Jun-Yan Zhu, San Jose, CA (US); Niloy Mitra, London (GB); Ratheesh Kalarot, San Jose, CA (US); Richard Zhang, San Francisco, CA (US); Shabnam Ghadar, Menlo Park, CA (US); Zhixin Shu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 384 days.

(21) Appl. No.: 17/468,487

(22) Filed: Sep. 7, 2021

(65) Prior Publication Data

US 2022/0122306 A1  Apr. 21, 2022

Related U.S. Application Data

(60) Provisional application No. 63/092,980, filed on Oct. 16, 2020.

(51) Int. Cl.
*G06N 3/08* (2023.01)
*G06F 3/04845* (2022.01)
(Continued)

(52) U.S. Cl.
CPC .......... *G06N 3/08* (2013.01); *G06F 3/04845* (2013.01); *G06F 3/04847* (2013.01);
(Continued)

(58) Field of Classification Search
CPC . G06T 2207/20081; G06T 2207/20084; G06T 2200/24; G06T 11/60; G06T 3/02;
(Continued)

(56) References Cited

U.S. PATENT DOCUMENTS 10,671,838 B1   6/2020  Bogan et al.
10,825,219 B2  11/2020  Fu et al.
(Continued)

FOREIGN PATENT DOCUMENTS

EP  3872747 A1  9/2021

OTHER PUBLICATIONS

Greg, "Photo Editing with Generative Adversarial Network (Part 2)" (Year: 2017).*

(Continued)

*Primary Examiner* — Dung Hong
(74) *Attorney, Agent, or Firm* — Kilpatrick Townsend & Stockton LLP

(57) ABSTRACT

Systems and methods dynamically adjust an available range for editing an attribute in an image. An image editing system computes a metric for an attribute in an input image as a function of a latent space representation of the input image and a filtering vector for editing the input image. The image editing system compares the metric to a threshold. If the metric exceeds the threshold, then the image editing system selects a first range for editing the attribute in the input image. If the metric does not exceed the threshold, a second range is selected. The image editing system causes display of a user interface for editing the input image comprising an interface element for editing the attribute within the selected range.

14 Claims, 17 Drawing Sheets
(6 of 17 Drawing Sheet(s) Filed in Color)

(51) Int. Cl.

| | | |
|---|---|---|
| *G06F 3/04847* | (2022.01) | |
| *G06F 18/21* | (2023.01) | |
| *G06F 18/211* | (2023.01) | |
| *G06F 18/214* | (2023.01) | |
| *G06F 18/40* | (2023.01) | |
| *G06N 3/045* | (2023.01) | |
| *G06N 20/20* | (2019.01) | |
| *G06T 3/02* | (2024.01) | |
| *G06T 3/18* | (2024.01) | |
| *G06T 3/40* | (2024.01) | |
| *G06T 3/4038* | (2024.01) | |
| *G06T 3/4046* | (2024.01) | |
| *G06T 5/20* | (2006.01) | |
| *G06T 5/77* | (2024.01) | |
| *G06T 11/00* | (2006.01) | |
| *G06T 11/60* | (2006.01) | |

(52) U.S. Cl.
CPC ......... *G06F 18/211* (2023.01); *G06F 18/214* (2023.01); *G06F 18/2163* (2023.01); *G06F 18/40* (2023.01); *G06N 3/045* (2023.01); *G06N 20/20* (2019.01); *G06T 3/02* (2024.01); *G06T 3/18* (2024.01); *G06T 3/40* (2013.01); *G06T 3/4038* (2013.01); *G06T 3/4046* (2013.01); *G06T 5/20* (2013.01); *G06T 5/77* (2024.01); *G06T 11/001* (2013.01); *G06T 11/60* (2013.01); *G06T 2207/10024* (2013.01); *G06T 2207/20081* (2013.01); *G06T 2207/20084* (2013.01); *G06T 2207/20221* (2013.01); *G06T 2210/22* (2013.01)

(58) Field of Classification Search
CPC .... G06T 3/18; G06T 5/77; G06T 3/40; G06T 3/4038; G06T 3/4046; G06T 5/20; G06T 11/001; G06T 2207/10024; G06T 2207/20221; G06T 2210/22; G06N 3/08; G06N 20/20; G06N 3/045; G06F 18/211; G06F 18/2163; G06F 18/40; G06F 18/214; G06F 3/04845; G06F 3/04847
See application file for complete search history.

(56) References Cited

U.S. PATENT DOCUMENTS

| | | | |
|---|---|---|---|
| 10,902,571 B2 | 1/2021 | Naruniec et al. | |
| 11,200,638 B2 | 12/2021 | He et al. | |
| 11,222,466 B1 | 1/2022 | Naruniec et al. | |
| 11,227,187 B1 | 1/2022 | Weinberger | |
| 11,354,792 B2 | 6/2022 | Fisher et al. | |
| 11,494,667 B2 | 11/2022 | Carbune et al. | |
| 11,521,362 B2* | 12/2022 | Bondich | G06T 19/006 |
| 11,544,880 B2 | 1/2023 | Park et al. | |
| 11,557,022 B2 | 1/2023 | Munkberg et al. | |
| 11,580,673 B1 | 2/2023 | Ren et al. | |
| 11,610,435 B2 | 3/2023 | Karras et al. | |
| 11,676,014 B1 | 6/2023 | Hallac | |
| 11,682,199 B2 | 6/2023 | Karras et al. | |
| 11,797,769 B1 | 10/2023 | Gangadharaiah et al. | |
| 11,875,221 B2 | 1/2024 | Lin et al. | |
| 11,880,766 B2 | 1/2024 | Smith et al. | |
| 11,907,839 B2 | 2/2024 | Kalarot et al. | |
| 11,915,133 B2 | 2/2024 | Kalarot et al. | |
| 2012/0301023 A1* | 11/2012 | Braun | G06T 11/001 382/167 |
| 2015/0063450 A1 | 3/2015 | Kim et al. | |
| 2015/0277686 A1* | 10/2015 | LaForge | G06Q 50/01 715/723 |
| 2015/0371422 A1* | 12/2015 | Kokemohr | G06T 11/60 382/311 |
| 2018/0225812 A1* | 8/2018 | DiVerdi | G06V 10/764 |
| 2018/0314716 A1 | 11/2018 | Kim et al. | |
| 2019/0213772 A1 | 7/2019 | Lombardi et al. | |
| 2019/0294108 A1 | 9/2019 | Ozcan et al. | |
| 2019/0295302 A1* | 9/2019 | Fu | G06V 10/82 |
| 2019/0378242 A1 | 12/2019 | Zhang et al. | |
| 2019/0385064 A1 | 12/2019 | Malaya | |
| 2020/0134778 A1* | 4/2020 | He | G06V 10/82 |
| 2020/0151559 A1 | 5/2020 | Karras et al. | |
| 2020/0242771 A1 | 7/2020 | Park et al. | |
| 2020/0242774 A1* | 7/2020 | Park | G06T 7/11 |
| 2020/0349393 A1 | 11/2020 | Zhong | |
| 2020/0372297 A1* | 11/2020 | Terjek | G06N 3/047 |
| 2020/0372621 A1 | 11/2020 | Naruniec et al. | |
| 2020/0380338 A1 | 12/2020 | Matsumura | |
| 2021/0019541 A1* | 1/2021 | Wang | G06V 40/172 |
| 2021/0182687 A1 | 6/2021 | Son et al. | |
| 2021/0209464 A1* | 7/2021 | Bala | G06N 20/00 |
| 2021/0279513 A1 | 9/2021 | Jie | |
| 2021/0327038 A1* | 10/2021 | Helminger | G06T 9/002 |
| 2021/0374402 A1 | 12/2021 | Kim et al. | |
| 2022/0044352 A1 | 2/2022 | Liao et al. | |
| 2022/0051479 A1* | 2/2022 | Agarwal | G06N 3/045 |
| 2022/0076374 A1* | 3/2022 | Li | G06T 3/10 |
| 2022/0084173 A1* | 3/2022 | Liang | G06T 5/50 |
| 2022/0084204 A1 | 3/2022 | Li et al. | |
| 2022/0108163 A1* | 4/2022 | Sokhandan Asl | G06V 10/7753 |
| 2022/0121876 A1 | 4/2022 | Kalarot et al. | |
| 2022/0121931 A1 | 4/2022 | Kalarot et al. | |
| 2022/0121932 A1 | 4/2022 | Kalarot et al. | |
| 2022/0122221 A1 | 4/2022 | Smith et al. | |
| 2022/0122222 A1 | 4/2022 | Smith et al. | |
| 2022/0122232 A1 | 4/2022 | Lin et al. | |
| 2022/0122305 A1 | 4/2022 | Smith et al. | |
| 2022/0122306 A1 | 4/2022 | Lin et al. | |
| 2022/0122307 A1 | 4/2022 | Kalarot et al. | |
| 2022/0122308 A1 | 4/2022 | Kalarot et al. | |
| 2022/0138897 A1* | 5/2022 | Singh | G06T 3/147 382/159 |
| 2022/0148244 A1 | 5/2022 | Ko et al. | |
| 2022/0156886 A1 | 5/2022 | Petrangeli et al. | |
| 2022/0198266 A1 | 6/2022 | Chakraborty et al. | |
| 2022/0254071 A1 | 8/2022 | Ojha et al. | |
| 2022/0309672 A1 | 9/2022 | Cherian et al. | |
| 2022/0366193 A1 | 11/2022 | Luo et al. | |
| 2023/0094954 A1 | 3/2023 | Sinha et al. | |
| 2023/0195281 A1* | 6/2023 | Charlton | G06F 3/0482 715/752 |
| 2023/0214953 A1 | 7/2023 | Yoo | |

OTHER PUBLICATIONS

Zhu, "Generative Visual Manipulation on the Natural Image Manifold" (Year: 2018).*

Andrew, "Neural Photo Editing with Introspective Adversarial Networks" (Year: 2017).*

U.S. Appl. No. 17/384,273 entitled "Identity-Preserving Techniques for Generative Adversarial Network Projection", filed Jul. 23, 2021, 72 pages.

U.S. Appl. No. 17/384,283 entitled "Multi-Scale Output Techniques for Generative Adversarial Networks", filed Jul. 23, 2021, 72 pages.

U.S. Appl. No. 17/384,357 entitled "Techniques for Domain to Domain Projection Using a Generative Model", filed Jul. 23, 2021, 72 pages.

U.S. Appl. No. 17/384,371 entitled "Direct Regression Encoder Architecture and Training", filed Jul. 23, 2021, 66 pages.

U.S. Appl. No. 17/384,378, entitled "Supervised Learning Techniques for Encoder Training", filed Jul. 23, 2021, 67 pages.

U.S. Appl. No. 17/468,476 entitled "Attribute Decorrelation Techniques for Image Editing", filed Sep. 7, 2021, 71 pages.

U.S. Appl. No. 17/468,498 entitled "Non-Linear Latent Filter Techniques for Image Editing", filed Sep. 7, 2021, 47 pages.

U.S. Appl. No. 17/468,511 entitled "Detail-Preserving Image Editing Techniques", filed Sep. 7, 2021, 64 pages.

U.S. Appl. No. 17/468,546 entitled "Techniques for Smooth Region Merging in Image Editing", filed Sep. 7, 2021, 63 pages.

(56) References Cited

OTHER PUBLICATIONS

Abdal et. al., "Image2StyleGAN: How to Embed Images Into the StyleGAN Latent Space?," arXiv:1904.03189v2 [cs.CV], Sep. 3, 2019, 23 pages.
Abdal et. al., "StyleFlow: Attribute-conditioned Exploration of StyleGAN-Generated Images using Conditional Continuous Normalizing Flows", arXiv:2008.02401v2 [cs.CV], Sep. 20, 2020, 22 pages.
Abdulnabi et. al., "Multi-task CNN Model for Attribute Prediction", arXiv:1601.00400v1 [cs.CV], Jan. 4, 2016, 11 pages.
Goodfellow et al., "Generative Adversarial Nets", NIPS, arXiv:1406.2661v1, Jun. 10, 2014, 9 pages.
Karim, Raimi "Intuitions on L1 and L2 Regularisation", Towards Data Science, Dec. 26, 2018, 11 pages.
Karras et al., "A Style-Based Generator Architecture for Generative Adversarial Networks", https://arxiv.org/pdf/1812.04948.pdf, Mar. 29, 2019, 12 pages.
Minaee et. al., "Image Segmentation Using Deep Learning: A Survey," IEEE Transactions on Pattern Analysis and Machine Intelligence, doi: 10.1109/TPAMI.2021.3059968, Nov. 15, 2020, 22 pages.
Pang et al, "Image-to-Image Translation: Methods and Applications," arXiv:2101.08629v1 [cs.CV], Jan. 21, 2021, 19 pages.
Richardson et al., "Encoding in Style: a StyleGAN Encoder for Image-to-Image Translation", arXiv:2008.00951v1 [cs.CV], Aug. 3, 2020, 16 pages.
Shen et al., InterFaceGAN: Interpreting the Disentangled Face Representation Learned by GANs, arXiv:2005.09635v2, Oct. 29, 2020, 16 pages.
Tewari, et al. "StyleRig: Rigging StyleGAN for 3D Control over Portrait Images", 13 pages.
Zhu et al., "Generative Visual Manipulation on the Natural Image Manifold", arXiv:1609.03552v3 [cs.CV], Dec. 16, 2018.
Non-Final Office Action, dated Dec. 7, 2023, U.S. Appl. No. 17/384,273, 12 pages.
Corrected Notice of Allowability, dated Nov. 30, 2023, U.S. Appl. No. 17/384,357, 2 pages.
Corrected Notice of Allowability, dated Dec. 13, 2023, U.S. Appl. No. 17/468,476, 2 pages.
Corrected Notice of Allowability, dated Dec. 14, 2023, U.S. Appl. No. 17/468,511, 2 pages.
Supplemental Notice of Allowance, dated Dec. 4, 2023, U.S. Appl. No. 17/468,546, 2 pages.
Kapusta et al., "Facial Appearance Modifications Using Skpca-derived Features Extracted From Convolutional Autoencoder's Latent Space", 2020 International Joint Conference on Neural Networks (IJCNN), (Jul. 1, 2020).
"A Stylemap-Based Generator for Real-Time Image Projection and Local Editing", ICLR 2021, 13 pages.
Deng et al., "ArcFace: Additive Angular Margin Loss for Deep Face Recognition", arXiv:1801.07698v3 [cs.CV], Feb. 9, 2019, 11 pages.
He et al., "Deep Residual Learning for Image Recognition", arXiv:1512.03385v1 [cs.CV], Dec. 10, 2015, 12 pages.
Huang et al., "Arbitrary Style Transfer in Real-time with Adaptive Instance Normalization", Department of Computer Science & Cornell Tech, Cornell University, 10 pages.
Karras et al., "Progressive Growing of GANs for Improved Quality, Stability, and Variation", ICLR, arXiv:1710.10196v3 [cs.NE], Feb. 26, 2018, pp. 26.
Karras et al., "Analyzing and Improving the Image Quality of StyleGAN", arXiv:1912.04958v2 [cs.CV], Mar. 23, 2020, 21 pages.
Pidhorskyi et al., "Adversarial Latent Autoencoders", arXiv:2004.04467v1 [cs.LG], Apr. 9, 2020, 10 pages.
Rajarapollu et al., "Bicubic Interpolation Algorithm Implementation for Image Appearance Enhancement" IJCST vol. 8, Issue 2, Apr.-Jun. 2017, 4 pages.
Simonyan et al., "Very Deep Convolutional Networks for Large-Scale Image Recognition", arxiv:1409.1556v6 [cs.CV], Apr. 10, 2015, 14 pages.
Zhang et al., "The Unreasonable Effectiveness of Deep Features as a Perceptual Metric", pp. 586-595, 10 pages.
Zhu et al., "Generative Visual Manipulation on the Natural Image Manifold", arXiv:1609.03552v2 [cs.CV], Sep. 25, 2016, 16 pages.
Zhu et al., "In-Domain GAN Inversion for Real Image Editing", arXiv:2004.00049v3 [cs.CV], Jul. 16, 2020, 31 pages.
Gao et al, "Res2Net: A New Multi-scale Backbone Architecture", arXiv:1904.01169v3 [cs.CV], Jan. 27, 2021, 11 pages.
Wiles et al., "Using Bottlenecks in Feedforward Networks as a Dimension Reduction Technique: An Application to Optimization Tasks", Neural Computation 8, 1179-1183, 1996, Downloaded from http://direct.mit.edu/neco/article-pdf/8/6/1179/813336/neco.1996.8.6.1179.pdf on Apr. 28, 2021, 5 pages.
Biswas et al., "Spatially Variant Laplacian Pyramids for Multi-Frame Exposure Fusion," arXiv:2002.01425v1, Feb. 4, 2020, 10 pages.
Burt et al., "The Laplacian Pyramid as a Compact Image Code," IEE Transactions on Communications vol. Com-31, No. 4, Apr. 1983, pp. 532-540.
Dahlke et al., "Multiscale Approximation," Understanding Complex Systems, 2007, 35 pages.
Glasbey et al., "A Review of Image Warping Methods," Journal of Applied Statistics 25, 1998, pp. 155-171.
Karasaridis et al., "A Filter Design Technique for Steerable Pyramid Image Transforms," Proc. Int'l Conf Acoustics Speech Signal Processing (ICASSP) IV, 1996, pp. 2387-2390.
Khabarlak et al., "Fast Facial Landmark Detection and Applications: A Survey," arXiv:2101.10808 (2021).
Smith et al., "Alpha and the History of Digital Compositing," Technical Memo 7, Microsoft Corporation, Aug. 15, 1995, 10 pages.
Wu et al, "Towards fitting a 3D dense facial model to a 2D image: A landmark-free approach", 8 pages.
Zou et al., "Object Detection in 20 Years: A Survey," arXiv:1905.05055 May 16, 2019, 39 pages.
"Basics of Affine Transformation," Neutrium, https://neutrium.net/mathematics/basics-of-affine-transformation/ (2012).
Notice of Allowance, dated Oct. 12, 2023, U.S. Appl. No. 17/384,357, 9 pages.
Notice of Allowance dated Oct. 6, 2023, U.S. Appl. No. 17/468,476, 9 pages.
Notice of Allowance dated Nov. 2, 2023, U.S. Appl. No. 17/468,546, 10 pages.
Huang et al., "Arbitrary Style Transfer in Real-time with Adaptive Instance Normalization", Proceedings of the IEEE International Conference on Computer Vision, 2017, pp. 1501-1510.
Zhang et al., "The Unreasonable Effectiveness of Deep Features as a Perceptual Metric", Proceedings of the IEEE International Conference on Computer Vision, 2018, pp. 586-595, 10 pages.
Wiles et al., "Using Bottlenecks in Feedforward Networks as a Dimension Reduction Technique: An Application to Optimization Tasks", Neural Computation 8, 1996, pp. 1179-1183.
Tewari, et al. "StyleRig: Rigging StyleGAN for 3D Control over Portrait Images", arXiv:2004.0012v2, Jun. 13, 2020, 13 pages.
Wu et al, "Towards fitting a 3D dense facial model to a 2D image: A landmark-free approach", 2015 IEEE 7th International Conference on Biometrics Theory, Applications and Systems (BTAS), 2015, 8 pages.
Corrected Notice of Allowability, dated Nov. 17, 2023, U.S. Appl. No. 17/468,476, 2 pages.
Notice of Allowance, dated Nov. 13, 2023, U.S. Appl. No. 17/468,511, 10 pages.
Supplemental Notice of Allowability, dated Nov. 17, 2023, U.S. Appl. No. 17/468,546, 2 pages.
Gur et al., "Hierarchical Patch Vae-gan: Generating Diverse Videos From a Single Sample", Advances in Neural Information Processing Systems, vol. 33, Available online at: https://doi.org/10.48550/arXiv.2006.12226, 2020, pp. 16761-16772.
Kalarot et al., "Component Attention Guided Face Super-Resolution Network: Cagface", Proceedings of the IEEE/CVF Winter Conference on Applications of Computer Vision, 2020.
Karnewar et al., "Msg-gan: Multi-scale Gradients for Generative Adversarial Networks", Proceedings of the IEEE/CVF Conference

(56) References Cited

OTHER PUBLICATIONS on Computer Vision and Pattern Recognition, Available online at: https://doi.org/10.48550/arXiv.1903.06048, 2020, pp. 1-18.

Kohl et al., "A Hierarchical Probabilistic U-net for Modeling Multi-scale Ambiguities", Available Online at: https://doi.org/10.48550/arXiv.1905.13077, May 30, 2019, pp. 1-25.

Yi et al., "Bsd-gan: Branched Generative Adversarial Network for Scale-disentangled Representation Learning and Image Synthesis", IEEE Transactions on Image Processing, vol. 29, Available Online at: https://ieeexplore.ieee.org/document/9165961, 2020, pp. 9073-9083.

Zhang et al., "Nested Scale-editing for Conditional Image Synthesis", Proceedings of the IEEE/CVF Conference on Computer Vision and Pattern Recognition, Available Online at: https://arxiv.org/abs/2006.02038, Jun. 3, 2020, pp. 1-18.

Notice of Allowance, dated Jul. 7, 2023, U.S. Appl. No. 17/384,357, 13 pages.

Non-Final Office Action, dated Jun. 22, 2023, U.S. Appl. No. 17/468,476, 15 pages.

Hahn et al., "Disentangling Latent Factors of Variational Auto-Encoder with Whitening", Artificial Neural Networks and Machine Learning-ICANN, 2019, pp. 590-603.

Liu et al., "Towards Disentangling Latent Space for Unsupervised Semantic Face Editing", IEEE, Trans Image Process, 2022, 14 pages.

Zhu et al., "Generative Visual Manipulation on the Natural Image Manifold", arXiv:1609.03552 [cs.CV], Dec. 16, 2018, 16 pages.

U.S. Appl. No. 17/384,283, Non-Final Office Action, Mailed on Feb. 29, 2024, 9 pages.

U.S. Appl. No. 17/468,511, Corrected Notice of Allowability, Jan. 12, 2024, 2 pages.

U.S. Appl. No. 17/468,546, Supplemental Notice of Allowability, Jan. 18, 2024, 2 pages.

U.S. Appl. No. 17/384,283, Final Office Action, Mailed on Mar. 26, 2024, 20 pages.

Hou, et al., "Deep Feature Similarity for Generative Adversarial Networks" 2017 4th IAPR Asian Conference on Pattern Recognition (Acpr). IEEE, 2017, pp. 115-119.

* cited by examiner

300

SELECT A SUBSET OF LAYERS, ASSOCIATED WITH THE TARGET ATTRIBUTE, IN THE NEURAL NETWORK
302

FEED THE FILTERED LATENT SPACE REPRESENTATION TO THE SELECTED SUBSET OF THE LAYERS
304

IDENTIFY A SECOND SUBSET OF LAYERS ASSOCIATED WITH NUISANCE ATTRIBUTES
306

REFRAIN FROM PASSING THE FILTERED LATENT SPACE REPRESENTATION TO THE IDENTIFIED SECOND SUBSET OF LAYERS
308

```
┌─────────────────────────────────────────────────────────────────────┐
│  OBTAIN A FIRST TRAINING DATA SET COMPRISING LATENT SPACE           │
│  REPRESENTATIONS OF A PLURALITY OF TRAINING IMAGES                  │
│                            1202                                      │
└─────────────────────────────────────────────────────────────────────┘
                                  ↓
┌─────────────────────────────────────────────────────────────────────┐
│  GENERATE A SECOND TRAINING DATA SET BY QUERYING AN EXTERNAL        │
│  DATABASE TO RETRIEVE A SET OF TRAINING IMAGES INCLUDING AN         │
│  ATTRIBUTE THAT IS UNCOMMON IN THE FIRST TRAINING DATA SET AND      │
│  GENERATING LATENT SPACE REPRESENTATIONS OF THE RETRIEVED           │
│  TRAINING IMAGES                                                     │
│                            1204                                      │
└─────────────────────────────────────────────────────────────────────┘
                                  ↓
┌─────────────────────────────────────────────────────────────────────┐
│  COMBINE THE FIRST DATA SET AND THE SECOND DATA SET TO GENERATE     │
│  COMBINED TRAINING DATA                                              │
│                            1206                                      │
└─────────────────────────────────────────────────────────────────────┘
                                  ↓
┌─────────────────────────────────────────────────────────────────────┐
│  USE THE COMBINED TRAINING DATA TO TRAIN A FILTERING VECTOR FOR     │
│  EDITING THE ATTRIBUTE THAT IS UNCOMMON IN THE FIRST TRAINING       │
│  DATA SET                                                            │
│                            1208                                      │
└─────────────────────────────────────────────────────────────────────┘
                                  ↓
┌─────────────────────────────────────────────────────────────────────┐
│  APPLY THE FILTERING VECTOR TO EDIT THE ATTRIBUTE THAT IS           │
│  UNCOMMON IN THE FIRST TRAINING DATA SET IN AN INPUT IMAGE          │
│                            1210                                      │
└─────────────────────────────────────────────────────────────────────┘
```

FIG. 12

ATTRIBUTE CONTROL TECHNIQUES FOR IMAGE EDITING

CROSS-REFERENCE TO RELATED APPLICATION

This application is a non-provisional application of and claims the benefit of the filing date of U.S. Provisional Application 63/092,980, filed on Oct. 16, 2020, which is herein incorporated by reference in its entirety for all purposes.

This application is related to concurrently filed applications titled "Attribute Decorrelation Techniques for Image Editing" and "Non-Linear Latent Filter Techniques for Image Editing," which are herein incorporated by reference in their entirety for all purposes.

This application is also related to U.S. patent application Ser. Nos. 17/384,273, 17/384,283, 17/384,357, 17/384,371, and 17/384,378, filed Jul. 23, 2021, which are herein incorporated by reference in their entirety for all purposes.

This application is also related to the concurrently filed applications titled "Detail-Preserving Image Editing Techniques" and "Techniques for Smooth Region Merging in Image Editing," which are herein incorporated by reference in their entirety for all purposes.

TECHNICAL FIELD

This disclosure generally relates to image editing techniques. More specifically, but not by way of limitation, this disclosure relates to latent filters for improved image editing using a generative model.

BACKGROUND

Many image editing tools provide features that enable a user to edit or modify an image. Some of these tools even use machine learning-based techniques for editing images. However, the image editing capabilities of existing tools are quite limited—the recreation of images is not accurate, the editing is limited to low-resolution images (e.g., 256×256) (i.e., large high resolution images cannot be processed at all or cannot be processed in a reasonable time frame for the desired end result), unwanted artifacts and effects are introduced into the recreated images, and other deficiencies.

Some image editing tools use machine learning models such as Generative Adversarial Networks (GANs) to generate realistic edited images. While GANs have been very successful in generating high quality edited images, existing techniques using GANs still have several shortcomings. Existing techniques for editing images using machine learning suffer from shortcomings in editing the images in a realistic fashion and in providing the user with adequate control over the edits.

SUMMARY

The present disclosure describes techniques for editing images to efficiently generate realistic and accurate edited images. More particularly, new and improved techniques are described for modifying a latent space representation of an image to control a selected attribute while maintaining realism and consistency among other attributes.

In some embodiments, an input image to be edited is processed using one or more machine learning models to generate a numerical representation of the input image that corresponds to a Generative Adversarial Network (GAN) trained to generate an image from such a numerical representation. This numerical representation is referred to as a latent space representation of the input image. The latent space representation is edited using a "linear latent filter," a vector manipulation, to generate edits in the ultimate output image. The techniques described herein are used to learn appropriate linear latent filters useable to apply edits in a targeted fashion while providing improved results.

In some embodiments, a computer-implemented method includes computing a metric for an attribute in an input image as a function of a latent space representation of the input image and a filtering vector for editing the input image, comparing the metric to a threshold, if the metric exceeds the threshold, selecting a first range for editing the attribute in the input image, if the metric does not exceed the threshold, selecting a second range for editing the attribute in the input image, and causing display of a user interface for editing the input image comprising an interface element for editing the attribute within the selected range.

In some embodiments, the method further includes receiving user input specifying edit parameters for the attribute, editing the attribute based on the specified edit parameters and the selected range to generate an edited image, and causing display of the edited image in the user interface. In some embodiments, the first range is smaller than the second range.

In some embodiments, the method further includes generating the filtering vector by obtaining training data comprising latent space representations of training images, identifying a direction in the training data corresponding to a distribution of the attribute, and generating the filtering vector as a function of the identified direction.

In some embodiments, the method further includes editing the attribute in the input image by generating the filtering vector for editing the attribute in the input image, applying the filtering vector to the latent space representation of the input image according to the selected range to generate a filtered latent space representation of the input image, and providing the filtered latent space representation of the input image as input to a neural network to generate an output image with an edit to the attribute.

In some embodiments, the neural network is a generator comprising a plurality of layers, and wherein providing the filtered latent space representation as input to the neural network further comprises selecting a subset of the layers associated with the attribute and feeding the filtered latent space representation to the selected subset of the layers. In some embodiments, the method further includes generating the latent space representation of the input image by applying a machine learning model to the input image.

In some embodiments, a non-transitory computer-readable medium has instructions stored thereon, the instructions executable by a processing device to perform operations including a step for selecting a range for an interface element for editing an attribute in an input image based on a latent space representation of the input image and a filtering vector for editing the input image, and causing display of a user interface for editing the image comprising the interface element with the selected range.

In some embodiments, a computing system includes a memory, a processor, and a non-transitory computer-readable medium comprising instructions which, when executed by the processor, perform the steps of obtaining a first training data set comprising latent space representations of a plurality of training images, generating a second training data set by querying an external database to retrieve a set of training images including an attribute that is uncommon in the first training data set and generating latent space representations of the training images with the attribute that is uncommon in the first training data set, combining the first training data set and the second training data set to generate combined training data, using the combined training data to train a filtering vector for editing the attribute that is uncommon in the first training data set, and applying the filtering vector to an input image to edit the attribute that is uncommon in the first training data set.

In some embodiments, generating the latent space representations of the images with the attribute that is uncommon in the first training data set comprises, for each training image of the retrieved set of training images including the attribute that is uncommon in the first training data set, applying a machine learning model to the training image. In some embodiments using the combined training data to train the filtering vector includes identifying a direction in the combined training data corresponding to a distribution of the attribute that is uncommon in the first training data set to generate the filtering vector.

In some embodiments, applying the filtering vector includes obtaining a latent space representation of the input image, applying the filtering vector to the latent space representation of the input image to generate a filtered latent space representation of the input image, and providing the filtered latent space representation as input to a neural network to generate an output image with a modification to the attribute that is uncommon in the first training data set.

In some embodiments, the neural network is a generator comprising a plurality of layers, and wherein providing the filtered latent space representation to the neural network further includes selecting a subset of the layers associated with the attribute that is uncommon in the first training data set and feeding the filtered latent space representation to the selected subset of the layers. In some embodiments, the steps further include causing display of a user interface comprising an interactive component configured to control the attribute that is uncommon in the first training data set and receiving input specifying a modification to the attribute that is uncommon in the first training data set, wherein the filtering vector is generated and applied based on the modification.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

FIG. 3 depicts an example of a process for reducing attribute correlation using selected layers of a generator according to certain embodiments of the present disclosure.

FIG. 12 depicts an example process for training and applying linear latent filters for uncommon attributes according to certain embodiments of the present disclosure.

DETAILED DESCRIPTION

Figure 1A:
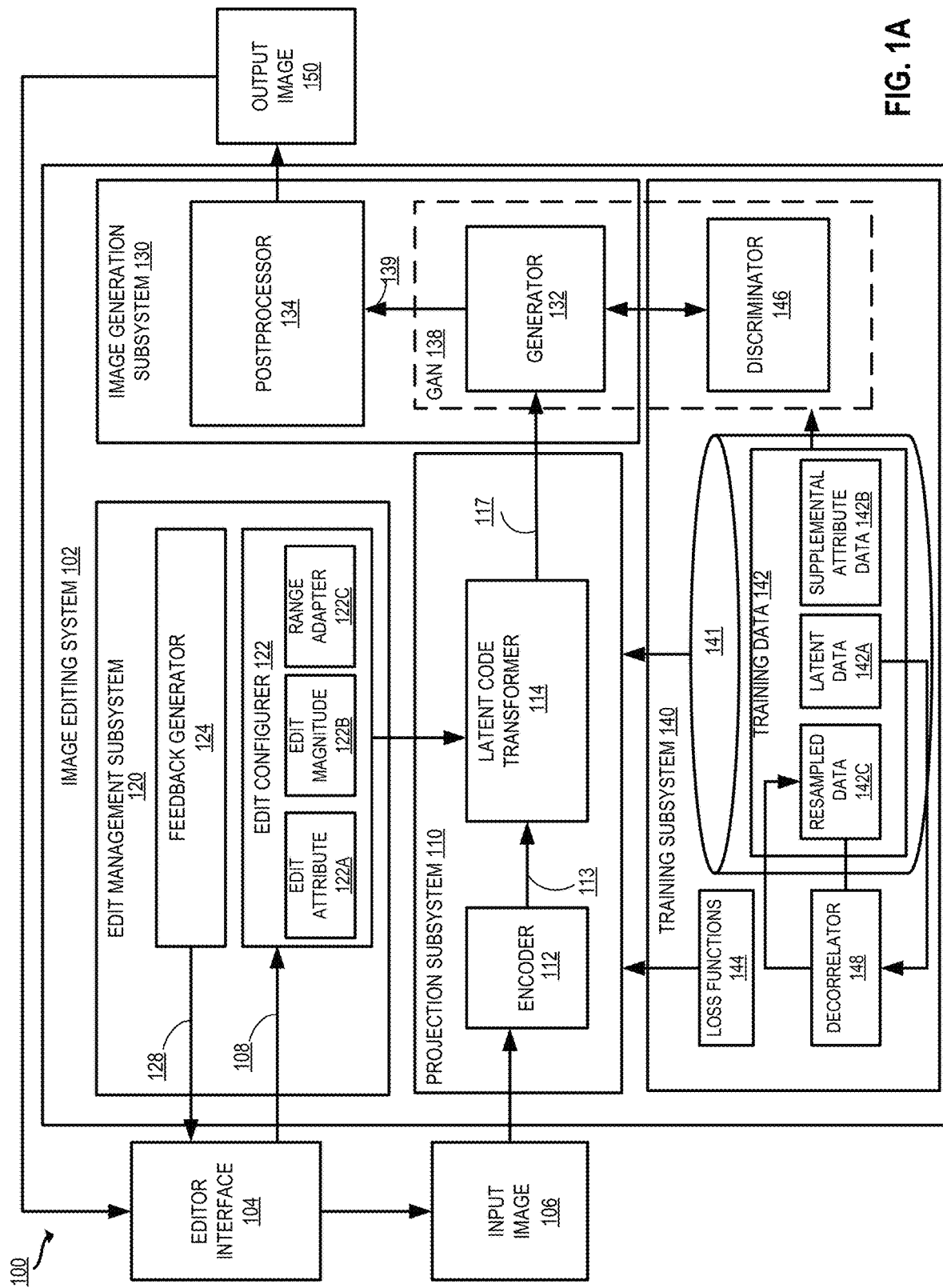
FIGS. 1A-1B depicts an example of a computing environment for editing an image using a linear latent filter according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for editing images to efficiently generate realistic and accurate edited images. More particularly, new and improved image editing techniques are described for editing or modifying images using a Generative Adversarial Network (GAN) with linear latent filters.

As noted above, image editing tools exist that use various machine learning based techniques (e.g., use various machine learning models) to generate realistic edited images. In particular, existing tools, even tools that use machine learning techniques, yield low quality results when editing images of where one or more facial attributes of the image are being edited.

As a specific example, facial attributes editing refers to functionality which enables users to edit single or multiple attributes (e.g. age, smile, hair color, or accessories) of a face in an image. For example: the input image depicts a face of a person at age "X," and the image is to be edited such that in the edited output image the face of the person corresponds to age "Y," where "Y" is different from "X." Multiple attributes may be edited. For example, in addition to editing the age, the face in the input image does not have a smile and the image is to be edited such that in the edited output image the face has a smile. The face in the input image has blonde curly hair and the image is to be edited such that in the edited output image the face has black straight hair. The face in the input image does not wear glasses, and the image is to be edited such that in the edited output image the face wears glasses, and various other edits and combinations of edits.

For purposes of this disclosure, an image containing a face is referred to as a face image. In the domain of facial attribute editing (i.e., editing of faces), existing solutions mainly follow the formulation of image-to-image (I2I) translation techniques. In some such I2I translation techniques, a deep neural network is trained to transform input face images directly to the output face images that have the target attributes. However, most of these approaches are limited in the edits that can be performed. The quality of the edits is also restricted and limited to low-resolution face images (e.g. 256×256 pixels). In addition, I2I approaches generally do not handle continuous editing (i.e., smoothly changing a particular parameter over a series of values). For example, existing solutions generally cannot be used to control the age of a face along a continuum (e.g., using a slider where a user can continuously move the slider to increase or decrease the age). I2I solutions also cannot be used to edit multiple attributes at the same time, for example, to simultaneously control changing the age and facial hair of a face.

Some editing tools take in an input image and use machine learning techniques to generate an intermediate representation of the image, referred to as latent space representation of the input image. Edits are then made to the latent space representation of the input image, and then then final edited output image is generated based upon the edited latent space representation. Some systems use vector addition to modify the latent code to edit the image. However, given biases in the training data, edits made to the latent space representation in existing techniques tend to create unwanted changes and add undesirable properties (e.g., unwanted artifacts) to the end result output edited image. As an example, when editing an image of a face to increase age, correlations between age and gender in the training data can lead to the gender unwittingly being changed along with the age, when only the age is to be changed. This is sometime referred to as attribute overcorrelation. Moreover, certain features are so uncommon in the training data that prior systems are unable to accurately edit an image to include these features (e.g., edit a face in an image to make it an angry face). Another issue with existing techniques is that in some cases, changing an attribute too much leads to unrealistic or strange undesirable results. For example, increasing the smile of a face more than a small amount in a grinning person can cause the face in the output image to cease looking like a realistic face.

The techniques described herein address these shortcomings and others and further provide additional features and functionalities. In certain embodiments, the disclosed techniques include new and improved machine learning-based techniques such as using a generator neural network (e.g., part of a GAN) to efficiently generate realistic and accurate images. To edit images with a generator neural network, a latent space representation z is discovered such that the image G(z) generated by the generator neural network is similar to a user-specified image x. The latent space may, for example, be a hypersphere made up of variables drawn from a Gaussian distribution. Through training, the generator neural network learns to map points in the latent space to specific output images. Such interpretation by the generator neural network gives structure to the latent space, which varies according to the generator used. For a given generator neural network, the latent space structure can be analyzed and traversed to control image generation.

In certain embodiments described in this disclosure, the techniques that are used for editing images include the use of linear latent filters to edit attributes in an image using vector arithmetic in the latent space. By adding a vector to the latent space representation of an input image in a targeted way, a target attribute can be edited. For example, adding a particular discovered vector (referred to as a "filtering vector" or "linear latent filter") to the latent space representation of an input image will modify the latent space representation, such that the ultimate output image looks older, younger, has glasses added or removed, changes the angle of their face, and so forth. As another example, a linear latent filter can be applied to an image of a tree to increase the height of the tree, change the amount of flowers or type of leaves on the tree, and so forth.

The novel techniques described herein provide improved image editing with linear latent filters in several ways. Training data is resampled to reduce undesirable correlations between attributes when using the linear latent filters. Alternatively, or additionally, latent code is processed using selected layers of a neural network to generate the output image, where the layers are selected to reduce attribute correlation. Alternatively, or additionally, training data is supplemented with images including attributes that are uncommon in general training data or image sets (e.g., faces with angry expression, handbags made of faux fur, purple houses, etc.). This enables editing of such attributes that would not otherwise be possible. Alternatively, or additionally, a range for modifying a parameter is adaptively selected based on an intensity of the attribute in the image to be edited. This prevents the edits from going into the range where training data is inadequate (e.g., by editing an image of a 80 year old person by increasing the age by 40 years), to avoid unrealistic or otherwise undesirable results. These techniques can be used separately or in combination to improve image editing results.

The following non-limiting examples are provided to introduce certain embodiments. In these examples, an image editing system applies a linear latent filter to edit an attribute in an image. As a specific example, an input image contains a human face. Attributes of a human face depicted in the image that can be edited, individually or in combination, may include hair color, age, gender, expression (e.g., smiling or angry), presence or absence of accessories (e.g., eyeglasses), skin color, pose (e.g., the pitch or tilt of the face), and others.

When editing a target attribute in an image, only the attribute being edited should change in the edited image, and other attributes that are not being edited should not change. For example, if a face in an image is to be edited to make the face look older, this should not change other attributes of the face such as the skin color of the face or the presence of glasses, etc. In certain embodiments, this is accomplished by generating a latent space representation of the input image. In the latent space, a direction is discovered such that changing the latent space representation in that direction changes the target attribute. For example, moving in X direction in the latent space makes hair darker in the ultimate output image or makes a handbag strap longer in the ultimate output image. A linear latent filter is generated and applied to the latent space representation, such that the latent space representation is modified in the discovered direction of change of the target attribute. An output edited image is then generated using the adjusted latent space representation.

As described in this disclosure, various techniques have been described that address the above-noted problems with attribute overcorrelation. The techniques described herein can further be used to find the appropriate degree of permissible change for an attribute (e.g., selecting a range for a slider for a particular attribute according to the intensity of the attribute in the image). Additionally, the various novel embodiments described in this disclosure are able to edit attributes that could not be achieved by prior art image editors, such as editing the face to show an angry expression, a sad expression, and the like. These various techniques described herein can be used separately or together to improve the results of image editing using linear latent filters.

Figure 6:
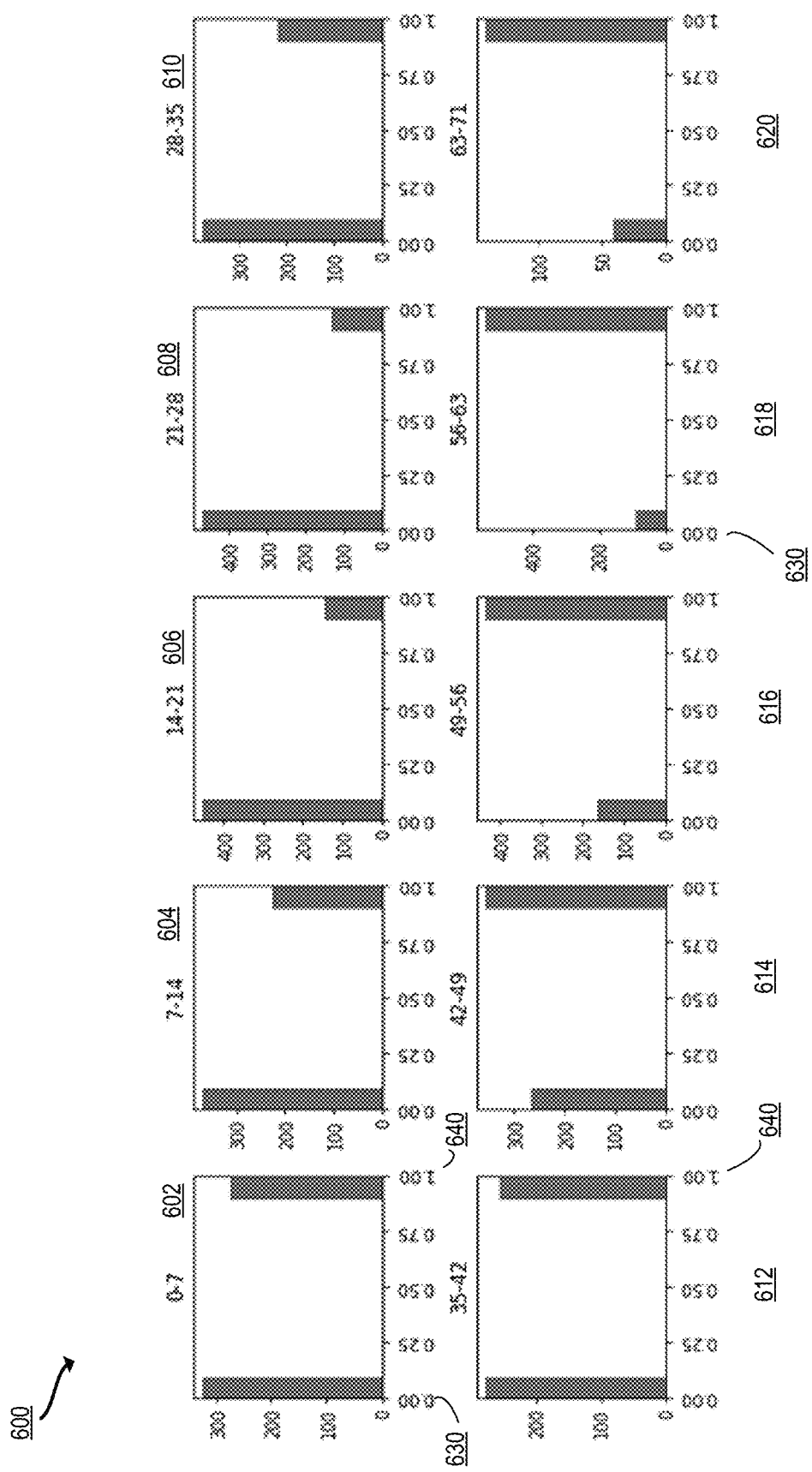
FIG. 6 depicts examples of binned attribute data according to certain embodiments of the present disclosure.

The following first example describes examples of techniques used to overcome the overcorrelation problem. In certain embodiments, an image editing system trains and applies a linear latent filter, or filtering vector, to a latent space representation of an input image. The filtering vector is trained such that, when editing a target attribute, changes to additional attributes (e.g., attributes other than the target attribute) are minimized. For example, using these techniques, if a human face in an image is to be edited to smile, unlike prior art systems, this edit will not affect or change other attributes of the face such as age, hair color, etc. First, the image editing system obtains training data. The training data is in the form of latent space representations of training images (e.g., encoded representations of images containing human faces). The image editing system then groups the training data into bins according to a distribution of a target attribute in the training data. For example, to train a linear latent filter for age, in certain embodiments, the image editing system bins the training data into ten bins for ages 0-7, 7-14, and so on. These bins may reveal that certain attributes are overcorrelated with the age attribute. For example, as shown in FIG. 6, for ages 56 and up, the vast majority of the training data is from images containing faces of females. Without any adjustments, this training data would lead to a linear latent filter that tends to make faces more female while adjusting age upward.

To address this issue, according to certain embodiments, the image editing system samples a subset of the training data in each bin. Given a target attribute (e.g., age), the image editing system identifies a target distribution of additional attributes (e.g., attributes other than age such as smile, hair color, glasses, etc.) in the training data. For example, based on the population and the desired result, the target distribution in the training data is 50% male and 50% female. Such considerations are used to configure a target distribution for each additional attribute. The data in each bin may then be adjusted (e.g., by selecting or removing training samples), such that overall distribution across bins matches the target distribution. This can be performed for various additional attributes such as gender, hair color, smile, pose, and so forth. This results in a set of sampled training data that has eliminated undesirable attribute overcorrelation. For example, although in a typical training data set, the gender skews more female as age increases, by resampling each bin of ages, the gender ratio can be maintained in a level fashion across age. By maintain the gender ratio across age, the gender is no longer overcorrelated with age, and ultimately, changing the age will not change the gender.

Next, the image editing system uses the resampled training data to train a filtering vector (e.g., a linear latent filter). The image editing system identifies a direction in the latent space of sampled training data corresponding to the distribution of the target attribute. The training subsystem trains a linear classifier to identify a hyperplane that separates semantic codes in the latent space with and without the target attribute. For example, target attribute is gender. The linear classifier is trained to separate the multiple dimensional latent space into two regions—one containing latent code corresponding to male faces, and the other containing latent codes corresponding to female faces. To identify the direction of change of the target attribute in the latent space, the image editing system computes a normal vector to the trained linear classifier. For example, the normal vector to the separating hyperplane for age will point in a direction such that moving in that direction in the latent space corresponds to latent codes with continuously increasing or decreasing ages. This normal vector is the filtering vector.

As part of applying a targeted attribute edit to an image, the image editing system applies the trained filtering vector to a latent space representation of an image to be edited. The image editing system obtains a latent space representation of an input image containing a face that is to be edited. For example, a user uploads a photograph of a person to be edited via the editor interface. The image editing system applies a machine learning model to the input image to generate the latent space representation of the input image. The latent space representation can be inferred by optimization and/or generated using an encoder, as described herein. The image editing system applies the learnt filtering vector to the latent space representation of the input image. Applying the filtering vector may be performed using vector addition to add the latent space representation to the filtering vector times a scalar used to control the degree of change of the target attribute to be edited. This results in a filtered latent space representation of the input image. By applying the filter to the latent space representation, the edits to the target attribute are applied.

The image editing system then uses the filtered latent space representation to generate an output image such that in the output image the targeted face attribute is edited per the desired edit. In certain embodiments, as part of generating the output edited image, the filtered latent space representation is provided as input to a multi-layered neural network (e.g., a generator such as the StyleGAN generator as described herein), which is configured to output a computer-generated image that looks perceptually similar to the input image, but with the desired edit or modification. For example, the age of the face in the output image is changed to the desired age (e.g., increased or decreased) without changing other attributes of the face such as gender, facial expression, etc. The other unedited face attributes in the output image remain same as in the input image.

Figure 4:
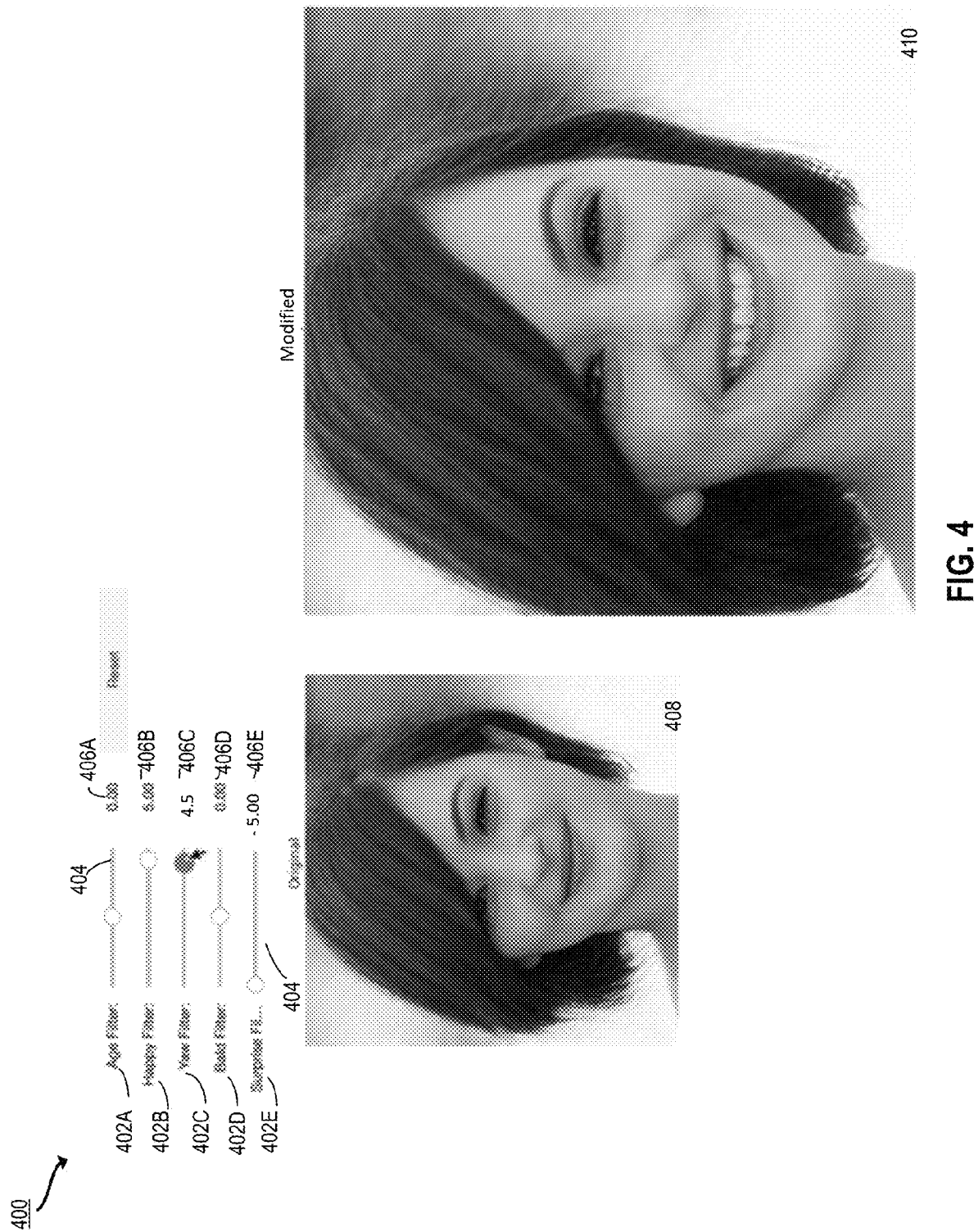
FIG. 4 depicts an example of an interface for slider-based image editing according to certain embodiments of the present disclosure.

In a second example, the image editing system dynamically changes the range of editing or modification to an attribute depicted in an image. For example, as described above with respect to the first example, a linear latent filter can be applied by adding the discovered normal vector multiplied by a scalar that controls how much change is made to the attribute. Depending on the image being edited, the appropriate range for that scalar may vary. For example, for a very young face in an image for which the age attribute of the face is to be edited and made younger, too much lowering of the age attribute can result in an age less than zero and can cause an unrealistic or inaccurate result. Similarly, for a very old face that is to be edited and made older, too much increase in the age attribute can result in an age higher than any training image available in training data, causing unrealistic and undesirable results. In certain embodiments, techniques are provided that can dynamically change the attribute range available. The attribute range available can represent permissible values of the scalar controlling the degree of attribute modification. For example, when editing images via a slider-based editing interface as illustrated in FIG. 4, the dynamic range selection is used to automatically place an upper and/or lower bound on the values of the slider.

In certain embodiments, for an attribute in the image that can be edited, the image editing system computes a metric for the attribute as a function of a latent space representation of the image and a filtering vector trained for editing the image. In particular, using the normal vector and latent space representation described above, it has been determined that the vector product of the latent space representation and the filtering vector represents the distance to the separating hyperplane in the latent space dividing images with and without a particular attribute. This distance to the separating hyperplane highly correlates to the intensity of the attribute value. For example, traveling in latent space away from the hyperplane discovered for the age attribute in one direction, the images begin to have features associated with increasing age. This can be used to identify an attribute intensity that reflects the magnitude of the attribute value in the attribute for the input image. For example, if the product of the latent space representation and the filtering vector is relatively high, then the image editing system can determine that this is a picture of an older person.

The image editing system compares the metric computed for an attribute (e.g., age) to a threshold determined for that attribute. In certain implementations, in order to determine a threshold for an attribute, the image manipulation subsystem performs statistical analysis of distance from hyperplane as a function of that attribute for a set of images to determine a threshold as a function of drop-off in the training data representative of that attribute. For example, due to the lack of training images of people aged 80 or higher, the range for editing the age attribute should be limited so that one cannot edit an image of a 70 year old to add 40 years to the age. The image editing system compares the determined threshold to the computed metric.

Based on the comparison, the image manipulation subsystem determines an appropriate range for editing the particular attribute in the image. In some implementations, rules are used to select one of two or more potential ranges, based on comparing the attribute intensity to the threshold. If the metric exceeds the threshold, then the image manipulation subsystem selects a first range for the attribute. If the metric does not exceed the threshold, then the image manipulation subsystem selects a second range for the attribute. For example, for the age attribute, for a particular input image depicting a face of an older person the image manipulation system may determine that the metric value for the face is 5. The image manipulation system may also have determined based upon the training data that the threshold value for the age attribute is 4.5. For this person, the appropriate range for editing the age attribute is relatively small. On the other hand, for a face of a teenager in an image, a larger range is available for increasing the age of the face, i.e., a larger range for changing the attribute value.

Upon selecting the appropriate range, the image editing system applies the selected range, e.g., via a user interface. For example, the image editing system displays a user interface provided for editing an image. The user interface may display one or more user-selectable and adjustable interface elements (e.g., slider bars), one for each attribute that can be edited. For an interface element corresponding to an attribute, there are minimum and maximum values. The selected range is applied such that, when the user manipulates the interface element, the maximum and minimum values set by the interface element are controlled according to the selected range. As a result, for a given input image, the image editing system adaptively selects a feasible range so that user-configured edits are limited to those that will provide realistic and aesthetically pleasing results.

In a third example, the image editing system enables a user to edit attributes that cannot be edited by conventional image editing tools. The image editing system performs a training process to learn to edit such attributes that conventionally cannot be edited. For example, in face images, traditional training data includes few of, or even none of, certain attributes such as angry faces, faces with bindis, and so forth. A target attribute is identified that is to be made editable. For example, to make a face angry (or sad), where the user can control the level of the anger to make a face more or less angry (or make a face more or less sad). A first training data set of training images is provided. Latent space representations of the training images are obtained. The latent space training images are then analyzed to identify those images in which faces represent the target attribute. If the number of such images is not sufficient (e.g., not sufficient for training with respect to the target attribute), then the training subsystem queries an external database, such as a stock image database, to identify and retrieve a set of images that represent the target attribute. The image editing system then generates latent space representations of the images that represent the attribute. The image editing system provides the images that represent the target attribute as input to a machine learning model configured to convert the images into latent space representations of the training images. The image editing system uses the latent space representations of the training images to augment the training data and teach a machine learning model to edit the target attribute.

The training subsystem uses the combined training data to train a filtering vector for editing the uncommon attribute. The filtering vector can be trained by identifying a linear classifier separating training data with and without the target attribute and computing a normal to that linear classifier, in a similar fashion as described above with respect to the first and second examples. This filtering vector can then be applied to edit the target attribute in an input image. For example, the filtering vector is a nonlinear latent filter for editing how angry the expression is in a face image. The image editing system takes an input image, encodes it to a latent space representation, and adds this latent space representation to the filtering vector times a scalar to control the strength of manipulation, in a similar fashion as described above with respect to the first and second examples. This modified latent space representation, with an angrier expression, is provided as input to a generator network configured to generate an output image with modification to the target attribute (e.g., angriness).

Accordingly, as described herein, the present disclosure describes various techniques that use improved machine-learning techniques to edit images and to produce improved and more realistic edited images. The described techniques solve many of the problems inherent in existing computer-implemented image editing environments. For example, techniques are described that reduce the correlation between attributes which causes an edit to a target attribute to also result in another non-edited attribute to be impacted in the generated edited image. This correlation problem is addressed by using a novel and improved training process wherein the correlation between attributes in the training data is reduced. As another example, thresholds are determined for an attribute that can be edited based upon the training data, where the thresholds define a range of editable values for the attribute such that the results from the edits appear realistic (i.e., do not lose their realism). This avoids situations in which an attribute is modified to the point that the image editing system can no longer generate a realistic image. For example, limits defining a range are placed on the degree of a smile that can be added to a face so that the face still looks realistic (i.e., prevents the smile from being increased beyond a degree where the face no longer looks like a realistic face). As yet another example, for a particular targeted attribute that is to be made editable, during the training phase, it is determined whether or not the provided training data has a sufficient number of images representative of the target attribute to be able to train a machine learning model to make the target attribute editable. If the sufficient number of such images is not present in the provided training data, during the training phase, other sources of images (e.g., publicly available sources of stock images) are searched to identify images that are representative of the target attribute. The training data set is then augmented with these identified images, and the resultant training generates a model that enables the target attribute to be made editable. This enables attributes, that were previously not editable (e.g., changing the level of anger or sadness shown in a face), to be made editable, which significantly enhances the edit functionality provided by the image editing system. This also makes the image editing system flexible, enabling new attributes to be made editable. Together or separately, the techniques described in this disclosure significantly improve the results of image editing.

Example of an Image Editing System

Figure 1B:
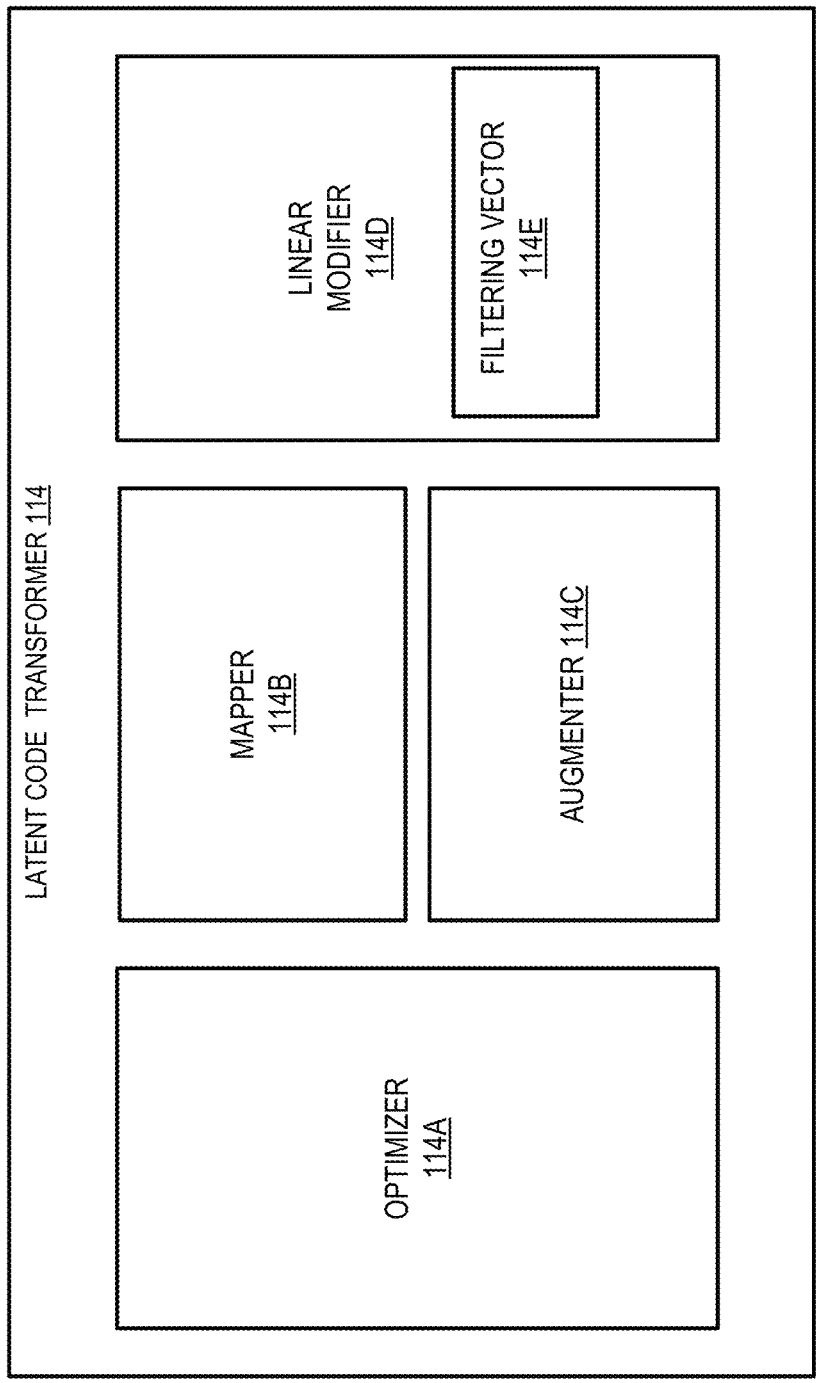

FIGS. 1A-1B depict an example of a computing environment 100 including an image editing system 102 that provides capabilities for editing electronic content such as digital photos and images. For example, as depicted in FIG. 1A, the image editing system 102 may receive as inputs an input image 106 that is to be edited and one or more edits to be made to the input image 106. The image editing system 102 is configured to edit the input image 106 per the edits and generate an output image 150 that is an edited representation of the input image 106 and incorporates the edits.

There are various ways in which the input image 106 and the edits to be made are input to the image editing system 102. In the example depicted in FIGS. 1A-1B, the image editing system 102 may provide an editor interface 104 that a user may use to provide inputs regarding the input image 106 to be edited and the one or more edits (e.g., edit parameters 108 to be made to the input image 106). The image editing system 102 then generates an edited output image 150 by applying the user-provided edits to the input image 106. In certain embodiments, the edited output image 150 may be presented or output to the user using the editor interface 104.

In some embodiments, the editor interface 104 may include one or Graphical User interfaces (GUIs) that enable a user to provide inputs identifying the input images, identifying the edits to be made to be made, setting configuration parameters for the image editing system 102, and the like. For example, a GUI may include one or more user-selectable elements that enable a user to input images 106 to be edited. One or more GUIs provided by the editor interface 104 may include one or more upload elements for uploading content (e.g., an upload field to upload an image to be edited). In some implementations, the editor interface 104 responds to user selection of an upload element by transitioning to a view showing available files to upload, prompt a user to take a photo, or the like.

One or more GUIs provided by the editor interface 104 may also include user-selectable elements that enable a user to specify the edits or modifications to be performed. For example, a GUI may display one or more sliders (e.g., as shown in FIG. 4) that can be manipulated by the user, each slider corresponding to an attribute of the image to be edited. Other elements provided by the GUIs may include text entry fields, buttons, pull-down menus, and other user-selectable options. In certain implementations, the editor interface 104 may be part of a content editing software such as Adobe Photoshop®, which is capable of receiving and editing digital content (e.g., digital photographs or other images).

Figure 14:
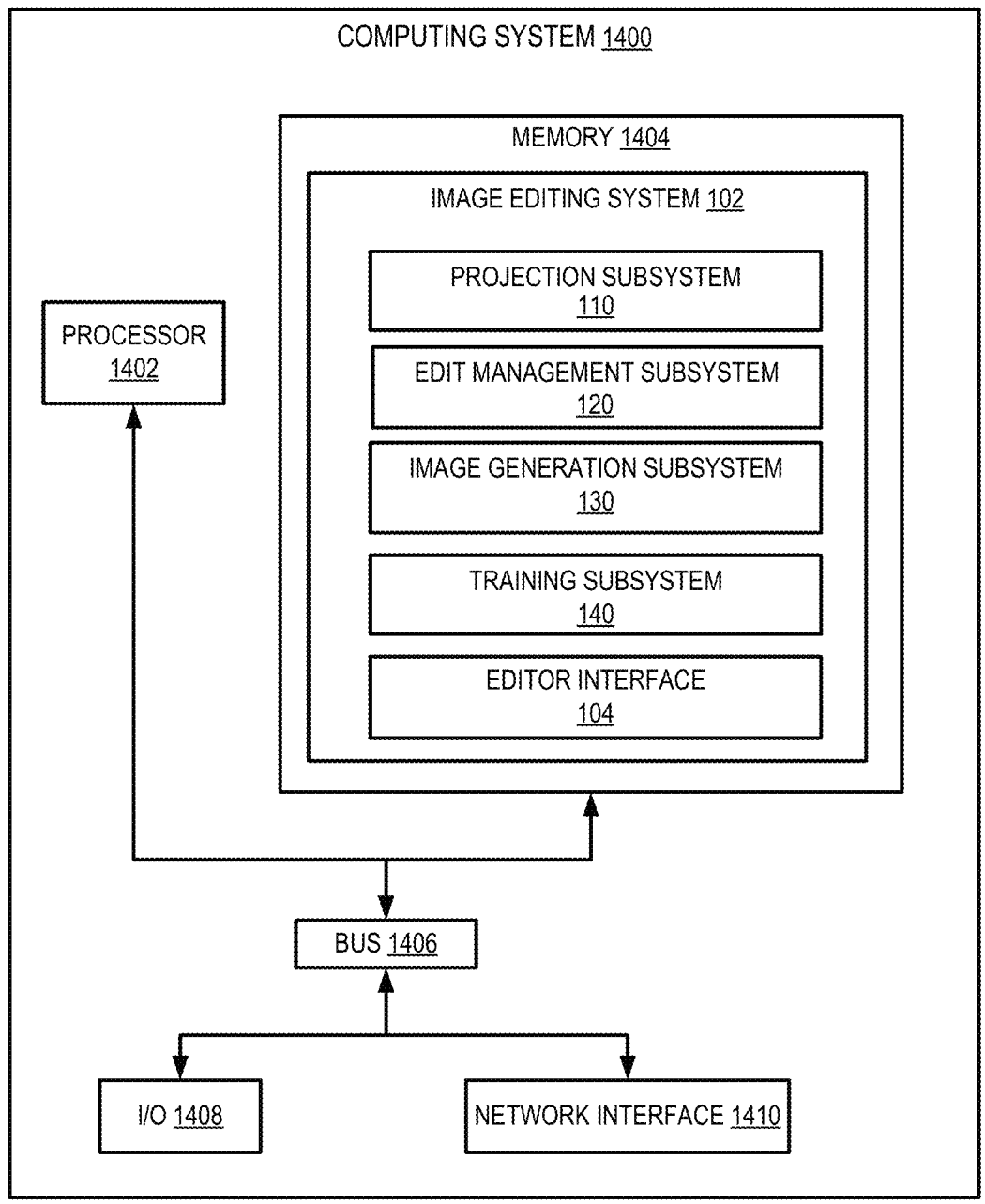
FIG. 14 depicts an example of a computing system that performs certain operations described herein according to certain embodiments of the present disclosure.
Figure 15:
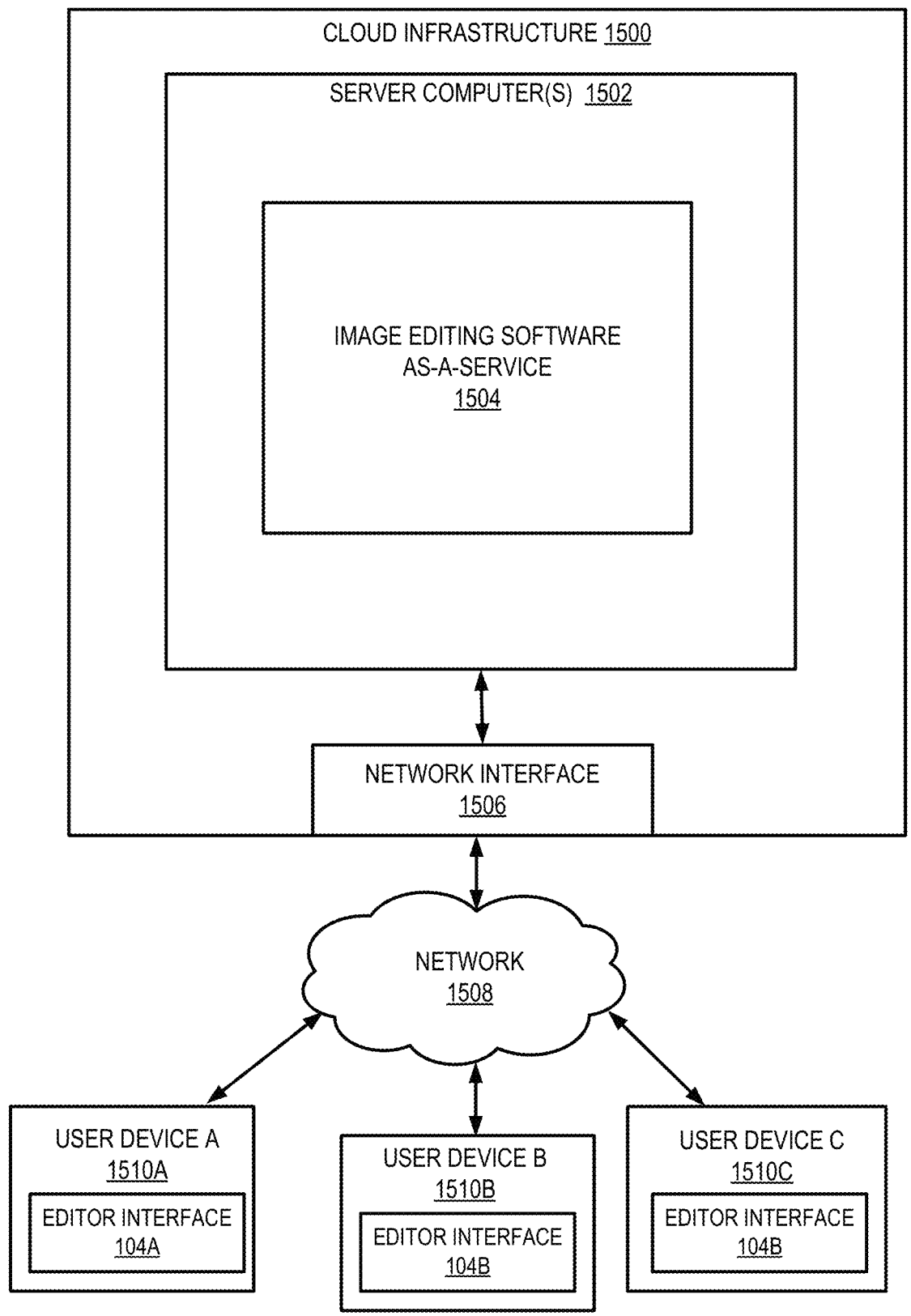
FIG. 15 depicts an example of a cloud computing environment that performs certain operations described herein according to certain embodiments of the present disclosure.

In some embodiments, the image editing system 102 and the editor interface 104 execute on a computing device, which may be used by a user. Examples of a computing device include, but are not limited to, a personal computer, a tablet computer, a desktop computer, a processing unit, any combination of these devices, or any other suitable device having one or more processors. In some other embodiments, the image editing system 102 and the editor interface 104 may operate on different computing systems, which may be communicatively coupled to each other. Examples of computer platform and implementations that may be used to implement the image editing system 102 are depicted in FIGS. 14 and 15 and described below.

The image editing system 102 may comprise multiple subsystems, which work in cooperation to generate edited output images 150. In the embodiment depicted in FIGS. 1A-1B, the image editing system 102 comprises a projection subsystem 110, a training subsystem 140, an edit management subsystem 120, and an image generation subsystem 130. Computing environment 100 depicted in FIGS. 1A-1B is merely an example and is not intended to unduly limit the scope of claimed embodiments. Many variations, alternatives, and modifications are possible. For example, in some implementations, the image editing system 102 may have more or fewer subsystems than those shown in FIGS. 1A-1B, may combine two or more subsystems, or may have a different configuration or arrangement of subsystems. The various systems, subsystems, and other components depicted in FIGS. 1A-1B may be implemented in software (e.g., code, instructions, program) only executed by one or more processing units (e.g., processors, cores) of the respective systems, using hardware only, or combinations thereof. The software may be stored on a non-transitory storage medium (e.g., on a memory device).

The various subsystems of the image editing system 102 can be implemented in the same computing system or different, independently operated computing systems. For example, the edit management subsystem 120 could be a separate entity from the projection subsystem 110, the image generation subsystem 130, and the training subsystem 140, or the same entity. The image editing system 102 may execute on a server separately from the editor interface 104, or other embodiments can involve the image editing system 102 being built into a software application executing the editor interface 104 on a user device.

One or more of the subsystems of the image editing system 102 include trained machine learning models or include components that use machine learning models that have been trained. For example, in the embodiment depicted in FIGS. 1A-1B, the training may be performed by a training subsystem 140, which may perform the training using various training data 142. In some implementations, the training subsystem 140 includes, or is communicatively coupled to, one or more data storage units 141 for storing the training data 142.

An edit management subsystem 120 configures edits to the input image 106 using an edit configurer 122 and a feedback generator 124. A projection subsystem 110 generates a latent space representation 113 representing the input image 106. A latent code transformer 114 generates a modified latent space representation 117 by applying one or more transformations, including the edits configured by the edit management subsystem 120, to the latent space representation 113 of the input image. An image generation subsystem 130 includes a generator 132 that generates an image according to the transformed latent space representation 117. In some aspects, the image generation subsystem 130 further includes a postprocessor 134 that performs postprocessing of the generated image 139 to produce the output image 150, which may be returned to the editor interface 104. In some embodiments, the training subsystem 140 trains one or more components of the latent code transformer 114 using the training data 142. In some implementations, the training subsystem 140 trains the generator 132 using a discriminator 146. In some implementations, the training subsystem 140 trains the encoder 112 and/or components of the latent code transformer 114 using one or more loss functions 144.

The edit management subsystem 120 includes hardware and/or software configured to control image edits. The edit management subsystem 120 includes an edit configurer 122 and a feedback generator 124. The edit configurer 122 receives edit parameters 108, e.g., editor configured modification instructions, from the editor interface 104. For example, edit parameters 108 may specify that an image of a person should be modified to include red hair and glasses. The edit configurer 122 identifies, from the provided edit parameters 108, an edit attribute 122A and an edit magnitude 122B. The edit attribute 122A is a target attribute to be edited. For example, for an image of a human face, the smile, hair length, age, and gender are examples of attributes that can be selected for editing. For an image of a shoe, attributes that can be edited include heel size, whether there is an open toe, and the color. The edit magnitude 122B is a degree of change to make to the edit attribute 122A. For example, a user can interact with a slider of the editor interface 104 to indicate that the smile should be increased or decreased by a certain amount. In some implementations, the attribute modifier supports multiple attribute editing—for example, the attribute modifier will receive indications of several edit attributes 122A and edit magnitudes 122B that are processed together (e.g., increase smile by +1 unit and decrease age by −2 units).

The edit configurer 122 may further include a range adapter 122C. The range adapter 122C includes functionality to further control the magnitude of modification available to a given attribute. In some embodiments, the range adapter 122C dynamically selects an appropriate range of modification for a given target attribute and input image, as described herein. The range adapter 122C may, for example, limit the edit magnitude 122B available. For example, the range adapter 122C caps how much the smile attribute can be increased in a given image to keep the ultimate result realistic and aesthetically pleasing. This can be reflected in the edit magnitude 122B (e.g., by bounding the slider range in the GUI, a user maxing out the smile slider will result in an edit magnitude of either 5 units to the smile attribute or 1 unit to the smile attribute, depending on the range selected by the range adapter 122C). The edit configurer 122 transmits an indication of the edit attribute 122A and edit magnitude 122B to the latent code transformer 114 of the projection subsystem 110 for further processing.

The feedback generator 124 prepares and transmits edit feedback 128 to the editor interface 104. Examples of such edit feedback 128 includes metrics showing how much an attribute is being modified (e.g., numerical values showing the selected edit magnitude 122B, as shown in 406A-406E of FIG. 4). Alternatively, or additionally, the edit feedback 128 includes preview images showing how the final output image will appear given the current edit parameters.

The projection subsystem 110 includes hardware and/or software configured to identify and transform latent space representations of images. The projection subsystem 110 receives as input the input image 106 and generates as output a modified latent space representation of the input image 117, which is a vector string of numbers reflecting edits to be applied to the input image 106.

In some implementations, the latent space representation 113 is generated using an encoder 112. Alternatively, or additionally, the latent space representation is generated using an optimizer 114A of the latent coder transformer 114, as shown in FIG. 1B. In some implementations, the projection subsystem 110 includes an encoder 112 configured to receive an input image 106, project the input image 106 into a latent space representation 113, and output the latent space representation 113. The projection subsystem 110 further includes and a latent code transformer 114, as illustrated and described in further detail with respect to FIG. 1B.

In some implementations, the encoder 112 is a machine learning model that has been trained to discover a latent space representation of the input image 106. The latent space representation (also referred to as semantic latent code or latent code) is a string of numbers (e.g., a n-dimensional vector, containing a value for each of the n-dimensions) that, when provided as input to the generator, creates a particular image (e.g., to replicate the input image 106). The encoder 112 is a machine learning model trained to generate such a latent space representation. The encoder 112 may, for example, be a feed forward network trained to encode the input image 106. Given an input image 106 and a generator 132, the encoder discovers a latent space representation of the input image z, such that when the latent space representation of the input image z is input to the generator 132, the resulting generated image 139 perceptually resembles the target input image 106.

The latent code transformer 114 includes functionality to optimize, transform, and/or edit the latent space representation 113 and/or an initial latent code to generate the modified latent space representation 117. Referring now to FIG. 1B, in some aspects, the latent code transformer 114 includes an optimizer 114A, a mapper 114B, an augmenter 114C, a linear modifier 114D, and a filtering vector 114E.

The optimizer 114A includes functionality to optimize a latent code to generate an optimized latent space representation that, when provided as input to the generator 132, results in an image that looks like the input image. In some aspects, the optimizer 114A takes an initial latent space representation 113 (e.g., as generated by the encoder 112) and the input image 106 as input and minimizes a loss between the initial latent space representation 113 and the input image 106. Different loss functions can be implemented for optimization, such as a pixel-by-pixel comparison of the input image 106 and an image generated from the initial latent space representation 113. The loss is minimized until the image generated based upon the latent space representation of the input image is perceptually similar to the input image 106 to a desired degree. This can be performed in conjunction with the encoder 112—by optimizing the latent space representation 113 generated by the encoder 112 to further increase similarity to the input image. Alternatively, the optimizer 114A can be applied to a random latent code to generate the latent space representation without the use of an encoder. In this case, the initial latent space representation used as input for the optimizer 114A may be randomly sampled from the latent space (e.g., from a Gaussian distribution) and optimized with respect to the input image to generate the latent space representation of the input image 113.

The mapper 114B includes functionality to map the latent space representation 113 from one latent space to another. For example, the encoder 112 and/or optimizer 114A generates a latent code in a first space, Z space, and the mapper 114B applies a mapping to transform the latent code from the Z space to a second space, W space. This mapping is executed in some implementations to facilitate image editing by transforming the latent space such that movement in the latent space smoothly correlates with changes to one or more target attributes. As an example, in the W space, incrementing the latent variable in a particular direction continuously makes hair color lighter in an image while maintaining the overall look of the image. In the Z space, such smooth changes with direction in the latent space are not always possible, as the Z space is more "entangled." W space transformation techniques and advantages are described in Karras et al., "A Style-Based Generator Architecture for Generative Adversarial Networks", https://arxiv.org/pdf/1812.04948.pdf (2019) ("StyleGAN") and Shen et al., InterFaceGAN: Interpreting the Disentangled Face Representation Learned by GANs, arXiv:2005.09635 (2020).

The augmenter 114C includes functionality to augment the latent space representation 113 from one dimensionality to another (e.g., to an extended latent space, also referred to as "W-plus" or "$W_p$" space). For example, the augmenter 114C transforms W space latent code, which is 512 dimensions, to $W_p$ space latent code, which is 512×18 dimensions. This facilitates image editing based on continuous properties of the latent space. $W_p$ space transformation techniques and advantages are described in Abdal et. al., "Image2StyleGAN: How to Embed Images Into the StyleGAN Latent Space?," arXiv:1904.03189 (2019).

The linear modifier 114D includes functionality to edit attributes in an image by modifying the latent space representation 113 in a linear fashion. The linear modifier 114D uses a filtering vector 114E to apply the edits. The filtering vector 114E is a function that, when applied to a latent space representation of an image, modifies one or more attributes in the image. For example, a linear latent filter is a function that applies a linear modification to a latent space representation of an image to edit an attribute, as described herein. The linear modifier may further use the edit magnitude 122B received from the edit configurer 122 to control the degree of modification to the attribute, as described herein. After the linear modifier 114D applies the edits to the latent space representation of the input image 113, this results in a modified latent space representation 117, which is passed to the image generation subsystem 130 for further processing.

Returning to FIG. 1A, the image generation subsystem 130 includes hardware and/or software configured to generate an output image 150 based on input code (e.g., the modified latent space representation 117). The image generation subsystem includes a generator 132 and a postprocessor 134.

The generator 132 includes a machine learning model which has been trained to generate a generated image 139 based on input latent code. In some implementations, the generator 132 is a neural network. The generator 132 is pretrained to generate data that is similar to a training set. Depending on the type of image to be edited by the image editing system 102, the generator may be trained to generate an image of a human face, a landscape, a dog, a cat, a shoe, and so forth. In some aspects, the generator 132 is trained to generate a specific type of image, as such targeted training can produce very realistic results. The generator 132 can produce a random new image (e.g., of a person that does not exist) based on random input (e.g., from a normal or Gaussian distribution). The generator can produce a new image that looks like an input image 106 using the techniques described herein and an input latent code that is generated based on the input image 106. In some implementations, the generator 132 is part of a Generative Adversarial Network (GAN) 138, and is trained in a zero-sum game with the discriminator 145.

In some embodiments, the postprocessor 134 ingests the generated image 139 and performs processing to prepare the output image 150. In some aspects, the projection subsystem 110 projects a portion of the input image 106 (e.g. a cropped region such as a face or a flower from within a larger image). In such cases, the generated image 139 is a subset of the input image 106, and the postprocessor 134 integrates the generated image 139 into the remaining portion of the input image 106 to generate the output image 150. Other postprocessing performed by postprocessor 134 may include smoothing portions of the generated image 139, increasing or decreasing the pixel size of the generated image 139, and/or combining multiple generated images 119.

The training subsystem 140 includes hardware and/or software configured to train one or more machine learning models as used by the image editing system 102. The training subsystem 140 includes a discriminator 136. The discriminator 136 is part of the GAN 138 including the generator 132, and evaluates the output of the generator 132 to train the generator 132. The discriminator 136 compares images produced by the generator 132 to real images, and the generator 132 works to "trick" the discriminator into determining that a generated image is actually a real image. Such a competition between the discriminator 136 and the generator 132 teaches the generator to produce extremely realistic images.

The training subsystem 140 further includes functionality to train the encoder 112, including one or more loss functions 144 that are minimized to train the encoder 112 to generate latent code that accurately represents the input image 106 and can be processed efficiently by the other elements of the projection subsystem 110. In some aspects, the training subsystem further includes functionality to train the edit configurer 122 and/or postprocessor 134.

The training subsystem 140 is further configured to train the latent code transformer 114 to edit images. This may include training a filtering vector 114E to be applied by the linear modifier 114D. The training subsystem 140 further includes a decorrelator 148 to remove unwanted correlations between attributes in the training data 142, as described herein. In some embodiments, the decorrelator 148 includes functionality to sample a subset of latent codes according to certain attributes. The decorrelator 148 may divide data into bins for a target attribute before sampling the training data. In some embodiments, the decorrelator 148 samples the training data (e.g., latent codes) so that the training data has a predetermined distribution of one or more additional attributes. For example, to reduce a correlation in training data with glasses and age, the percentage of training data having glasses is fixed across bins.

The data storage unit 141 can be implemented as one or more databases or one or more data servers. The data storage unit 141 includes training data 142 that is used by the training subsystem 140 to train the engines of the image editing system 102. The training data 142 includes latent data 142A, which includes latent space representations of images. The latent data 142A can include latent space representations of thousands of random images of a type that the generator 132 should be trained to generate (e.g., hundreds of thousands of random faces). The resampled data 142C is data that has been resampled by the decorrelator 148 as described above. In some embodiments, the training data 142 further includes supplemental attribute data 142B for teaching the image editing system 102 to generate images with attributes that are uncommon in the latent data 142A such as an angry expression or unusual hair color, as described herein.

Example Techniques for Attribute Decorrelation in Linear Latent Filters

Figure 2A:
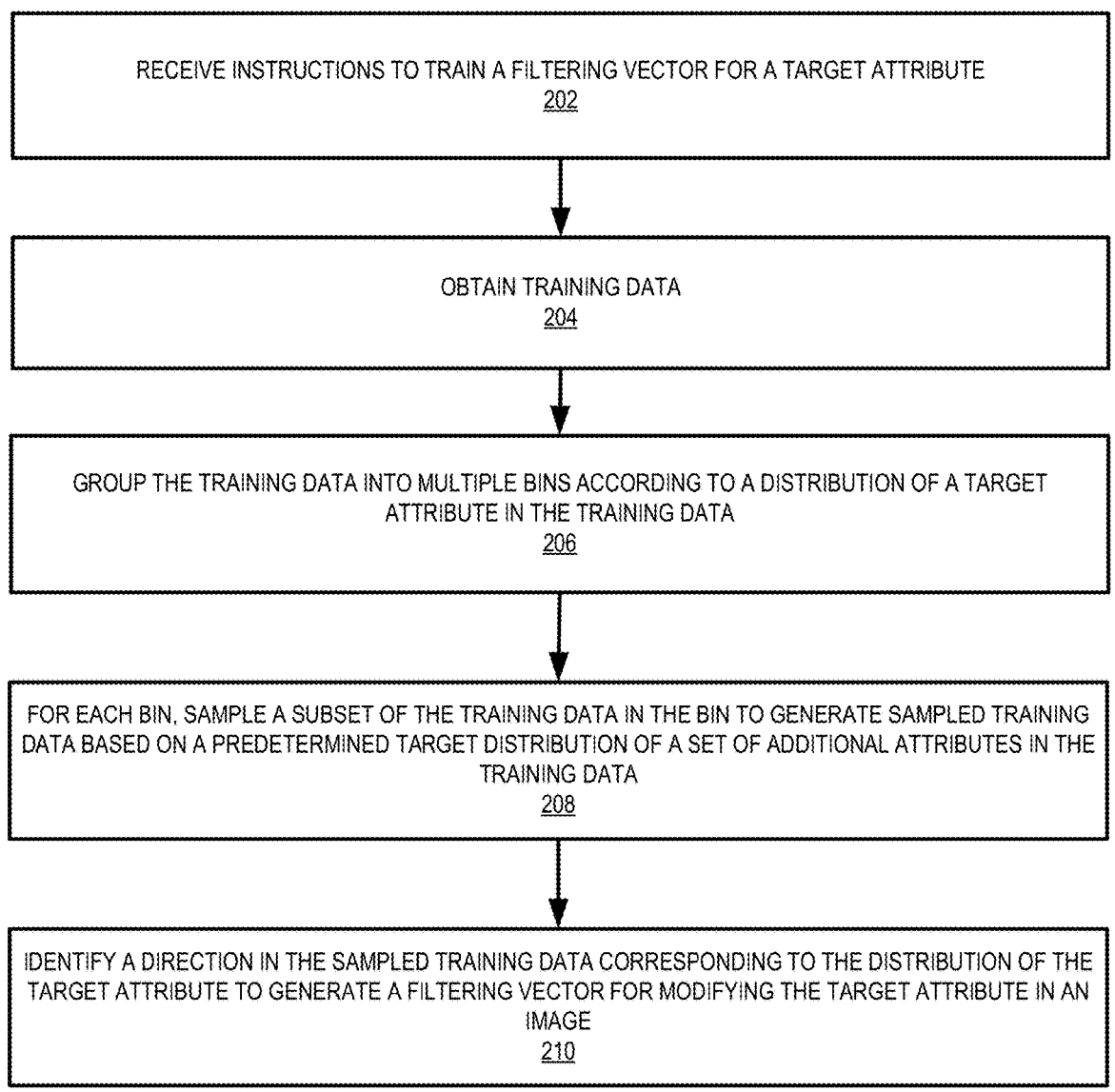
FIG. 2A-2B depicts an example of a process for reducing attribute correlation using latent space sampling according to certain embodiments of the present disclosure.
Figure 2B:
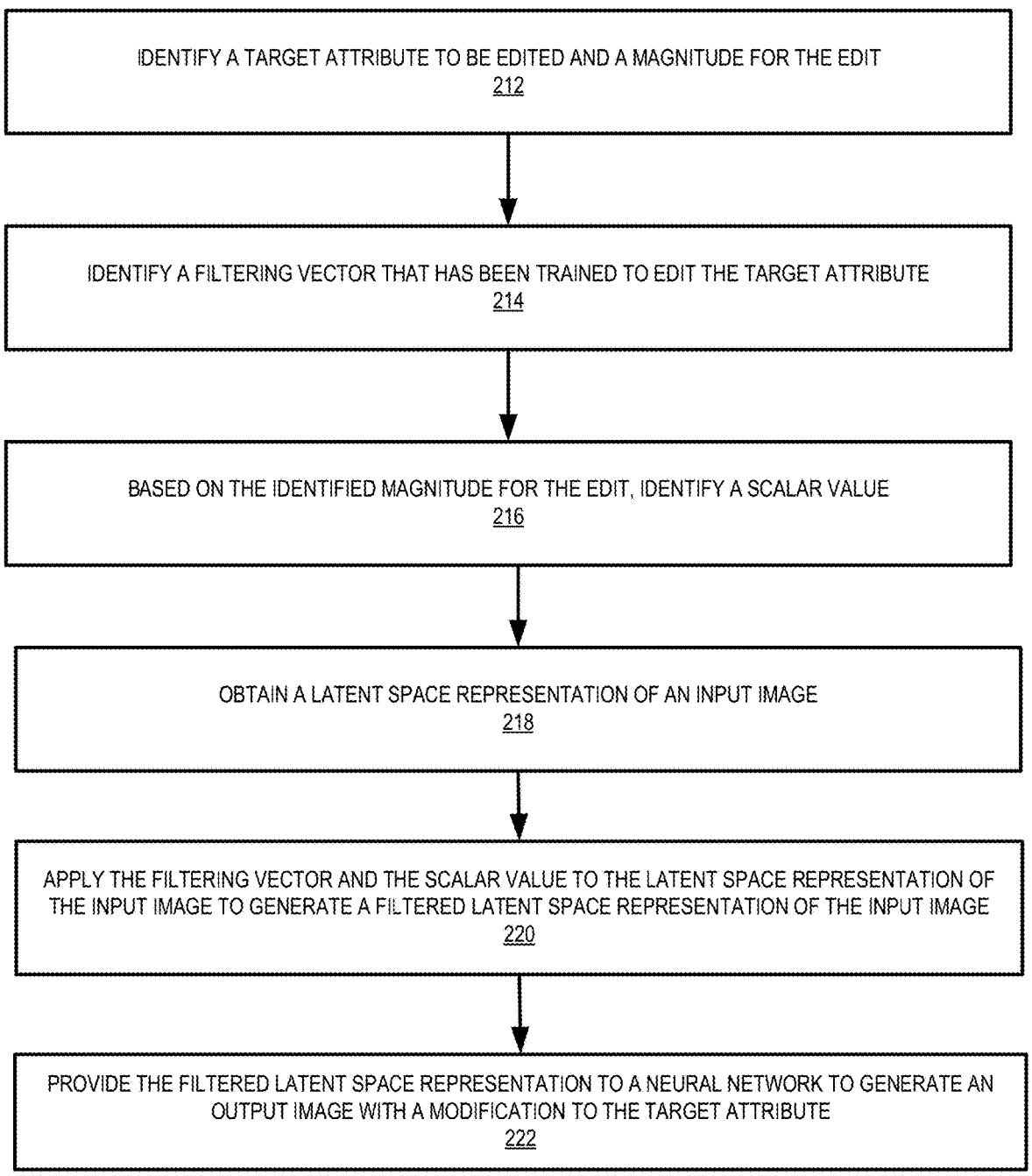

FIGS. 2A-2B illustrate an example process 200A-200B for training (in FIG. 2A) and applying (in FIG. 2B) a filtering vector for use in editing a target attribute in an image without undesirable modification to other non-target attributes. The processing depicted in FIGS. 2A-2B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 2A-2B and described below is intended to be illustrative and non-limiting. Although FIGS. 2A-2B depict the various processing steps occurring in a particular sequence or order, this is not intended to be limiting. In certain alternative embodiments, the processing may be performed in some different order or some steps may also be performed in parallel. In some implementations, one or more process blocks of FIGS. 2A-2B may be performed by an image editing system (e.g., the image editing system 102 of FIGS. 1A-1B). In some implementations, one or more process blocks of FIGS. 2A-2B may be performed by another device or a group of devices separate from or including the image editing system 102 (e.g., the editor interface 104 executing on a user device).

With reference to FIG. 2A, in some embodiments, at 202, the training subsystem 140 of the image editing system 102 receives instructions to train a filtering vector for a target attribute. The training subsystem 140 can train various filtering vectors (e.g., linear latent filters) to edit various respective attributes. For instance, one filtering vector is trained to edit the appearance of ages of faces in images, and another filtering vector is trained to rotate the angle of faces in images. As another example, for images of shoes, one filtering vector is trained to edit heel sizes in the images, and another filtering vector is trained to edit the color of the shoes in the images. The instructions to train a filtering vector for a particular target attribute can be received via input from an administrator. Alternatively, or additionally, the image editing system may automatically identify the target attribute for training the filtering vector to edit (e.g., by analyzing the training data 142 for labeled attributes).

At 204, the training subsystem 140 obtains training data 142 for the training to be performed. For example, the training subsystem obtains training data by retrieving the training data 142 from the data storage unit 141. The obtained training data 142 includes latent space representations of input training images which have been labeled to denote attributes. For example, 500,000 latent codes labeled with attributes are obtained. In the context of images containing faces, each such image may have associated one or more labels identifying the various attributes, including editable attributes, represented by the image. For example, a training image may have labels associated with it indicating whether a particular attribute is present in that image or not, where examples of attributes are glasses (or other accessories, in general, whether or not present), age (e.g., on a scale of 0 to 100), hair color (e.g., ranging from lightest to darkest), smile (e.g., present or not and, if present, the degree of the smile), anger, sadness, skin color, hair type, etc. In the context of shoe images, example attributes include color, heel size, shoelaces (present or not present), and so forth. Alternatively, or additionally, obtaining the training data may include generating the training data by labeling latent space code for each training image. Obtaining the training data may further include generating the latent space representations, which may be encoded and/or optimized from real input training images.

At 206, the decorrelator 148 of the training subsystem 140 groups the training data into multiple bins according to a distribution of a target attribute in the training data. For example, for non-binary attributes (attributes having more than two possible values), the data is divided into three or more bins, each bin spanning a range of multiple attribute values. As a specific example, for the non-binary attribute of age, the set of latent codes (e.g., the training data obtained at 202) is grouped into 10 bins, each bin spanning seven years. An example of such age-based bins is illustrated in FIG. 6. The decorrelator may identify an attribute such as age for each respective latent code representation using the labels on the training data (e.g., first latent code is labeled "21," second latent code is labeled "45," etc.), and sort the training data into the appropriate bin base on the identified attribute.

In some embodiments, at 208, for each of the bins established at 206, the decorrelator samples a subset of the training data in the bin to generate sampled training data. The decorrelator uses a target distribution of each additional attribute (e.g., each attribute labeled in the training data in addition to the target attribute) to sample the training data. For example, the target distribution of gender should be close to 50/50 across the bins established at 206 (e.g., have an equal number of latent codes corresponding to women and men). For bins with different distributions, excess training data can be removed (e.g., if there are 90% female faces in the bin for ages 56-63, some of the latent codes corresponding to female faces in this age bin are removed to bring the gender distribution in the bin equal to the target distribution of 50/50). In some implementations, such ratios correspond to the pre-determined target distributions. For each attribute, there is a target distribution (e.g., for gender, the target distribution is 50% male and 50% female; for glasses, the target distribution is 20% with glasses and 80% without glasses, and so forth). These target distributions, for example, are selected via input parameters provided by an administrator. Alternatively, or additionally, the system may analyze statistical information about the population to automatically establish such target distributions. For example, based on statistical analysis of the population, 15% of people have glasses, so the target distribution of glasses or no glasses should be around 15% with classes across the bins.

Figure 7:
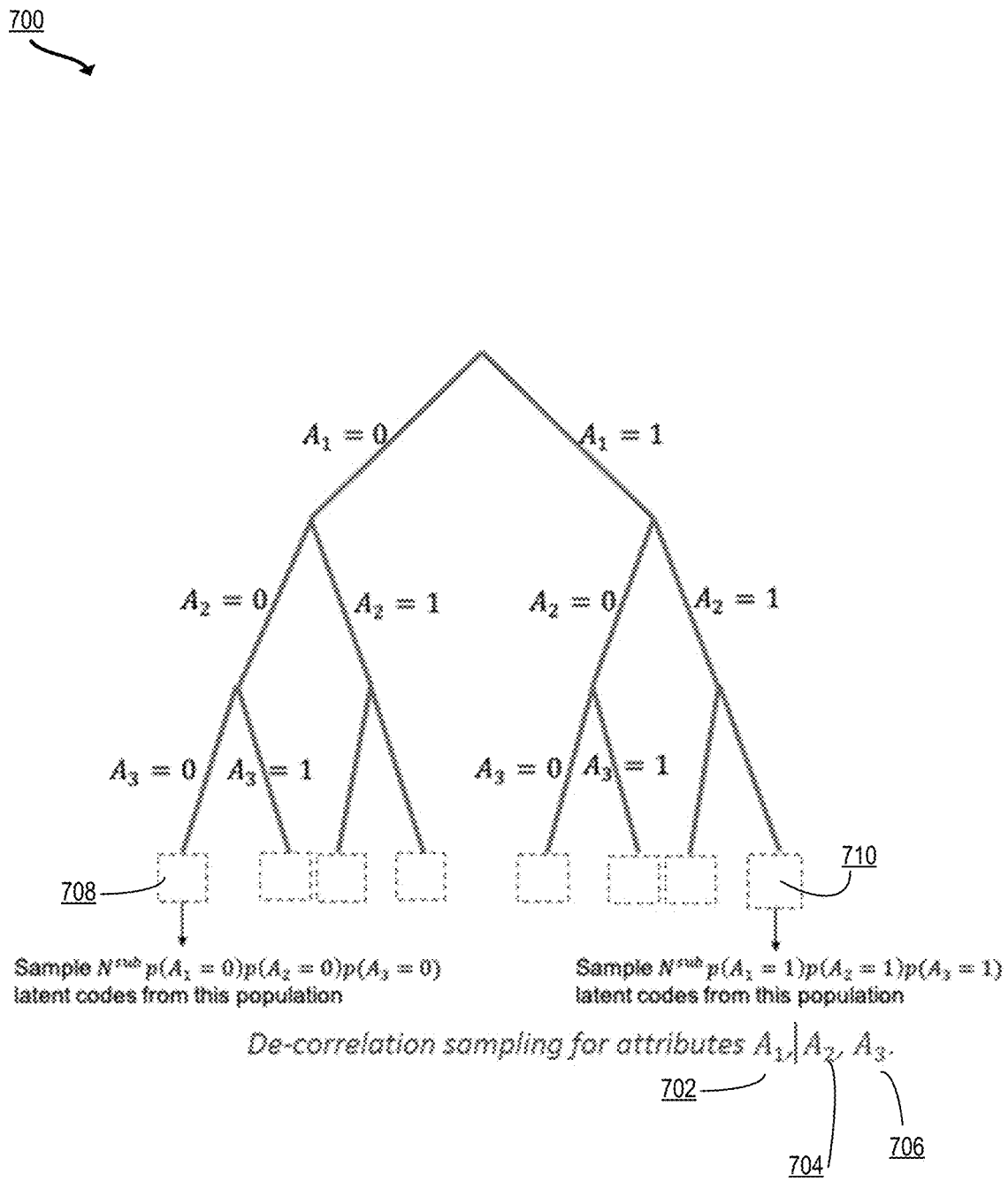
FIG. 7 depicts an example of decorrelation sampling according to certain embodiments of the present disclosure.

In some aspects, the additional attributes are binary attributes (e.g., attributes with two possible values, such as gender, glasses, and beard). A specific resampling scheme for binary attributes can be expressed as follows. The decorrelator takes a set of binary attributes $\mathcal{A} = \{A_1, A_2, \ldots, A_r\}$. For example, $\mathcal{A} = \{\text{gender, glasses, beard}\}$. The decorrelator denotes the event that an attribute is positive (e.g., there are glasses or there is a beard) as $A_i=1$ and the event that an attribute is negative (e.g., there are not glasses or there is not a beard) as $A_i=0$. Given a set of latent code, the goal is to sample a subset of the latent code with size $N^{sub}$ such that on this subset, $$p(A_1, \ldots, A_r) = p(A_1)p(A_2) \ldots p(A_r)$$

where $p(A_1)$, $p(A_2)$, $p(A_r)$, are pre-determined marginal distributions. The decorrelator selects $p(\text{gender}=1)=0.5$, $p(\text{glasses}=1)=0.2$, and $p(\text{beard}=1)=0.2$ in the dataset. To achieve this, for any event $A_1=a_1, A_2=a_2, \ldots, A_r=a_r$, which can be constructed by array indexing, the decorrelator samples $$N^{sub} \cdot p(A_1=a_1) \cdot p(A_2=a_2) \ldots p(A_r=a_r)$$

latent space representations from the population. In some aspects, to consider all $2^r$ combinations of $a_1, a_2, \ldots a_r$, the decorrelator takes the union of the sampled latent space representations as the resulting decorrelated dataset. A demonstrative example is shown in FIG. 7.

Accordingly, in some implementations, sampling the subset of the training data includes determining a marginal distribution of each additional attribute of the set of additional attributes, setting each marginal distribution to a value corresponding to the pre-determined target distribution to control correlations between the attributes, and taking the union of the marginal distributions of a set of possible combinations of attribute values.

In some embodiments, at 210, the image editing system (e.g., the training subsystem 140) identifies a direction in the sampled training data corresponding to the distribution of the target attribute to generate a filtering vector for editing the target attribute in an image. The filtering vector is generated such that applying the filtering vector to the latent space representation of the input image will edit the target attribute identified at 202. For example, a filtering vector for the attribute of age can be used to increase or decrease the amount of age-related features such as adding wrinkles, gray hair, etc. to a face in an input image.

In some implementations, the training subsystem generates the filtering vector based on analysis of the sampled training data. This may involve identifying a direction in the sampled training data corresponding to the distribution of the target attribute. As an example, the training subsystem generates a filtering vector $n_a$ for a target attribute a by training a linear classifier to separate the latent space into two regions, one that includes the target attribute, and one that does not include the target attribute (e.g., a hyperplane separating two segments of the hypersphere of the latent space, one with latent codes representing a face with glasses, and one with latent codes representing a face without glasses). As another example, for nonbinary attributes such as age, the linear classifier is trained to separate latent codes representing faces with ages above and below the mean or average age value in the training dataset. This training of the linear classifier results in a hyperplane that separates semantic latent codes $\{W_i\}_{i=1}^{N}$ with different properties of the target attribute a in the latent space of the sampled training data.

Upon identifying the hyperplane separating the latent codes, the training subsystem identifies a normal vector perpendicular to that hyperplane. For example, the training subsystem determines an equation for the hyperplane $n_a x + d = 0$, as a function of the normal $n_a$, a point on the hyperplane x, and d, the distance from a point to the hyperplane. This normal vector $n_a$ is the filtering vector.

One or more operations in blocks 206-210 implement a step for generating a filtering vector for editing a target attribute in the training data by sampling a subset of the training data to decorrelate the target attribute from a set of additional attributes in the training data. For instance, at block 206, the training subsystem groups the training data into bins, at block 208, the training subsystem samples the binned training data to decorrelate the target attribute from the additional attributes in the training data, and at 210, this sampled training data is used to generate the filtering vector, as described above.

With reference to FIG. 2B, At 212, the image editing system (e.g., the projection subsystem 110 of the image editing system) identifies a target attribute to be edited and a magnitude for the edit. In some implementations, an editor selects the target attribute and the magnitude via the editor interface, and this is processed by the edit configurer which provides the selected edit attribute (e.g., age, gender, etc.) and edit magnitude (e.g., a numerical value indicating how much the editor wants to change the attribute to the projection subsystem, which can be configured via sliders as shown in FIG. 4).

As a specific example, using sliders as depicted in FIG. 4, a user can provide input specifying desired attribute modifications. The image editing system may cause display of a user interface. Causing display of a user interface may include transmitting instructions for rendering the user interface to an external user device. Alternatively, or additionally, causing display of the user interface may include rendering the user interface on a display component of the image editing system. The user interface includes interactive components such as sliders, text entry boxes, and/or the like. These interactive components are configured to control respective attributes including the target attribute. Via the interactive components, the image editing system may receive input specifying the modification to the target attribute. For example, based on a user moving a slider for a particular attribute, the image editing system that attribute as the target attribute to be edited. Based on a degree of modification specified by the user input (e.g., how far the slider is moved), the image editing system may increase or decrease the magnitude for the edit.

At 214, the projection subsystem identifies a filtering vector that has been trained to edit the target attribute. For example, this is the filtering vector generated at 210. To identify the filtering vector (e.g., from a set of filtering vectors), for example, the projection subsystem queries available filtering vectors based on the target attribute identified at 212, and identifies the filtering vector for editing that target attribute.

At 216, the projection subsystem identifies a scalar value based on the identified magnitude for the edit. In some implementations, the projection subsystem sets the edit magnitude identified at 212 to the scalar value (e.g., receive an edit magnitude of 5, which is the scalar value). Alternatively, the projection subsystem may compute the scalar value according to the received edit magnitude (e.g., receive an edit magnitude of 6, and rescale the received edit magnitude to generate a scalar value of 3).

At 218, the projection subsystem obtains a latent space representation of an input image. For example, the projection subsystem generates a latent space representation of the input image by applying the a machine learning model to the input image. The projection subsystem may provide the input image as input to one or more machine learning models trained to generate latent space representations of images.

In some implementations, the machine learning model is an encoder. The encoder receives the input image as input, and is trained to output a latent space representation of the input image. For example, the encoder is a neural network that generates a latent space representation z of the input image in Z space, as described above with respect to FIG. 1B. In some implementations, a generated Z space latent space representation is further modified to map to W space and/or augmented to $W_p$ space, as described above with respect to FIG. 1B. Alternatively, a $W_p$ space representation can be generated directly using the techniques described in U.S. patent application Ser. No. 17/384,371, titled "Direct Regression Encoder Architecture and Training."

Alternatively, or additionally, the machine learning model is an optimizer (e.g., the Limited-memory Broyden-Fletcher-Goldfarb-Shanno algorithm (L-BFGS) or another suitable optimizer). The projection subsystem provides the input image and an initial latent code to the optimizer as input. This input latent code may either be a random latent code sampled from the latent space (e.g., according to a Gaussian distribution) or an initial latent space representation of the input image generated by the encoder. A loss function is selected. The loss function may include or more components. For example, the loss function may include a pixel loss component that compares an image generated from the latent code to the input image on a pixel-by pixel basis. The loss function may include additional components, such as a semantic loss component. The selected loss function, the input image, and an initial latent code are input to an optimizer, the loss is minimized, and the output is the latent space representation of the input image obtained at 218.

Alternatively, in some implementations, the projection subsystem obtains the latent space representation of the input image as direct input. For example, the latent space representation of the input image may be received from an external computing device that generated the latent space representation of the input image.

At 220, the projection subsystem applies the filtering vector identified at 214 and the scalar value identified at 216 to the latent space representation of the input image to generate a filtered latent space representation of the input image. For example, given the latent space representation $W_p^{in}$ for an input image, the projection subsystem applies the filtering vector and the scalar value to the latent space representation to edit the value of the attribute a by applying:

$$W_p^{in} + s \cdot n_a$$

where $n_a$ is the filtering vector for attribute a, and s is the scalar value identified at 216 to control the amount of editing to the attribute a. The $s \cdot n_a$ value can be added to the latent space representation of the input image to increase the attribute value (e.g., make a person in an image appear older) or subtracted from the latent space representation of the input image to decrease the attribute value (e.g., make a person in an image appear younger).

At 222, the image editing system (e.g., the image generation subsystem 130) provides the filtered latent space representation as input to a neural network to generate an output image with a modification to the target attribute. In some implementations, the neural network is a generator. Image generation with a generative model is described in, e.g., Goodfellow et al., Generative Adversarial Nets, NIPS, 2014 (arXiv:1406.2661v1) and Karras, "A Style-Based Generator Architecture for Generative Adversarial Networks", https://arxiv.org/pdf/1812.04948.pdf (2019) ("StyleGAN", supra). In some implementations, further attribute decorrelation is achieved by providing the filtered latent space representation to selected layers of the generator, as described in further detail below with respect to FIG. 3.

In some embodiments, the target attribute is continuously edited using the operations of FIG. 2B. For example, responsive to user input via a slider gradually increasing for an attribute, the image editing system modifies the attribute to multiple states. As a specific example, as a user increases the age slider, the scalar value is smoothly increased in magnitude to smoothly and continuously edit the age attribute by repeatedly performing the processing of blocks 212-222. By virtue of the decorrelation techniques of the process 200A-200B, the target attribute is modified to different states without unwittingly changing the additional attributes. For example, age is increased to 20, 30, and 40 years, without adding glasses or modifying gender.

FIG. 3 is a flowchart of an example process 300 for attribute decorrelation using selected layers of a generator, according to some embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. In some implementations, one or more process blocks of FIG. 3 may be performed by an image editing system (e.g., the image editing system 102 of FIGS. 1A-1B). In some implementations, one or more process blocks of FIG. 3 may be performed by another device or a group of devices separate from or including the image editing system 102 (e.g., the editor interface 104 executing on a user device).

In some embodiments, at 302, the image editing system selects a subset of layers in a neural network (e.g., the neural network used at block 222 of FIG. 2B). These layers are selected based on an association with the target attribute (e.g., the attribute to be edited, as identified at block 212 of FIG. 2B). In some implementations, the neural network is a generator comprising multiple layers. For example, the neural network is a generator g with 18 layers. A suitable generator g is described in Karras, "A Style-Based Generator Architecture for Generative Adversarial Networks", https://arxiv.org/pdf/1812.04948.pdf (2019) ("StyleGAN", supra).

Different layers of g control semantics with different granularity. By selecting a subset of layers in g when applying the filtering vector $n_a$, the image editing system can further ensure that additional attributes or nuisance factors that are not related to the target attributes (e.g. skin tone) will not be changed. For example, it has been found that the following attributes are controlled using the following layers in the StyleGAN generator, where the top row is the attributes and the bottom row is the corresponding layers for those attributes:

| Age  | Anger | Bald | Smile | Surprise | Yaw |
|------|-------|------|-------|----------|-----|
| 4-10 | 4-10  | 2-6  | 0-10  | 0-8      | 0-6 |

By identifying the target attribute of interest and the corresponding layers that control that target attribute, the image editing system can select the appropriate layers. For example, for the target attribute "bald," layers 2-6 of the neural network are selected.

In some embodiments, at 304, the image editing system feeds the filtered latent space representation to the selected subset of the layers. The filtered latent space representation generated at block 220 of FIG. 2B may selectively be provided as input to the appropriate layers of the generator. For example, for the target attribute "bald," the filtered latent space representation is provided to layers 2-6 of the neural network and used to generate the output image. Accordingly, in some embodiments, providing the filtered latent space representation to the neural network further comprises selecting a subset of the layers associated with the target attribute, and feeding the filtered latent space representation to the selected subset of the layers.

In some embodiments, at 306, the image editing system identifies a second subset of layers associated with nuisance attributes. The nuisance attributes are additional attributes, other than the one being edited, that tend to be overcorrelated with the target attribute. For example, "bald" tends to correlate with age, in that, when editing a face image of a person to appear older, without decorrelation, the person depicted in the image will also tend to appear more bald as age increases, regardless of gender. To decorrelate the attributes, the image editing system may identify layers associated with a nuisance attribute. For example, based on identifying the nuisance attribute age, layers 1-2 of the neural network are selected because these layers have been found to control age.

In some embodiments, at 308, the image editing system refrains from passing the filtered latent space representation to the identified second subset of layers. For example, based on identifying layers 1-2 as being associated with nuisance attributes at 306, the image editing system refrains from passing the filtered latent space representation to layers 1-2.

In some implementations, if the layers associated with the nuisance attributes overlap with the layers associated with the target attribute, those overlapping layers are omitted from the selected subset of layers through which the filtered latent space representation is fed. For example, for the target attribute smile, layers 1-10 are selected, but upon determining that yaw is a nuisance attribute, layers 0-6 are not selected, and the filtered latent space representation is input to layers 7-10. Alternatively, in other implementations, in the case of overlap, only those layers not overlapping are omitted at 308. For example, the target attribute is smile (layers 1-10) and the nuisance attribute is yaw (layers 0-6). The image editing system passes the filtered latent space representation to layers 1-10 of the neural network, and refrains from passing the filtered latent space representation to layer 0 of the neural network.

FIG. 4 illustrates an example user interface 400 for facial attribute editing, according to some embodiments. The user interface 400 includes a set of sliders 404 for controlling attribute edits in an input image 408.

As illustrated in FIG. 4, each slider 404 corresponds to a particular attribute filter 402A-402E for a particular attribute. The attribute filters are age filter 402A, happy filter 402B, yaw filter 402C, bald filter 402D, and surprise filter 402E. Responsive to user input modifying the slider 404 position for an attribute, that attribute will be continuously adjusted. For example, moving the surprise filter 402E slider 404 to the right results in a more surprised expression, and moving the surprise filter 402E slider 404 to the left results in a less surprised expression. As each slider 404 is adjusted, numerical values 406A-406E indicating the strength of the attribute are modified. For example, as shown in FIG. 4, the happy filter 402B and yaw filter 402C have relatively high values of 5.0 and 4.5. The user interface 400 further includes an input image 408, as originally provided without edits, and an output image 410, as modified using the settings configured via the sliders 404.

Figure 5:
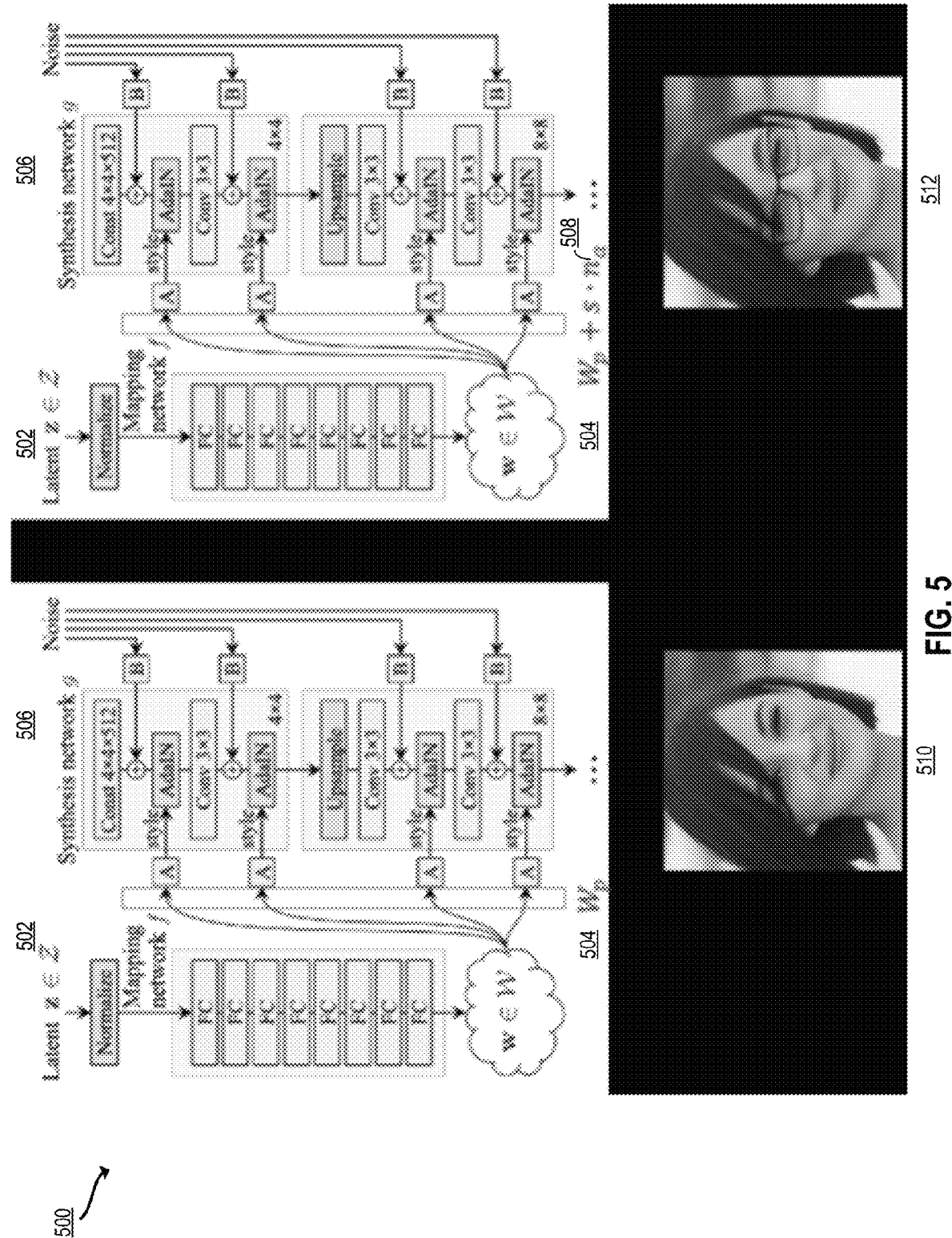
FIG. 5 depicts a schematic diagram illustrating the use of linear latent filters according to certain embodiments of the present disclosure.

FIG. 5 is a schematic diagram 500 illustrating an example of using a linear latent filter for editing an attribute (glasses), according to some embodiments. The latent code z 502 is normalized and passed as input to a mapping network and augmented to project the latent code into $W_p$ 504 (e.g., as described above with respect to FIGS. 1A-1B and 2A-2B. On the left-hand side, the $W_p$ code 504 is passed to the generator network g 506 to generate an unedited generated image 510, without glasses. On the right-hand side, the linear latent filter $n_a$ 508 is applied to $W_p$ to edit the attribute a to modify the latent space representation to add glasses. Providing this modified latent space representation to the generator neural network g 506 results in an edited generated image 512, with glasses.

FIG. 6 is a graph 600 illustrating an example conditional distribution of attributes, according to some embodiments. In the example depicted in FIG. 6, the distribution of the attribute gender is shown across a set of ten bins according to age 602, 604, 606, 608, 610, 612, 614, 616, 618, and 620. Bin 602 is for ages 0-7, bin 604 is for ages 7-14, and so forth, as shown in FIG. 6.

The conditional distribution of gender with respect to age can be expressed as P(gender|age). Gender=1 represents female, as indicated by 640. Gender=0 represents male, as indicated by 630. Using the plot of gender distribution for different age groups as shown in FIG. 6, it can be observed that the correlation between the two attributes, gender and age, is high. For example, in age group 7-14 (604), there are more male faces than female faces, while in age group 63-71 (620), there are more female faces than male faces. This example motivates the approach of training data decorrelation as described above with respect to FIGS. 2A-2B.

FIG. 7 illustrates an example schematic diagram 700 illustrating de-correlation sampling for attributes, according to some embodiments. In FIG. 7, three attributes $A_1$ 702, $A_2$ 704, and $A_3$ 706 are considered. Latent space representations are sampled from the population, as described above with respect to FIG. 2A. For example, at 708, $N^{sub} \cdot p(A_1=0) \cdot p(A_2=0) \ p(A_3=0)$ is sampled from the population, at 710, $N^{sub} \cdot p(A_1=1) \cdot p(A_2=1) \ p(A_3=1)$ is sampled from the population, and so forth. This decorrelates the attributes in the training data, so that, when editing a target attribute, the effect on other attributes is minimized.

Figure 8:
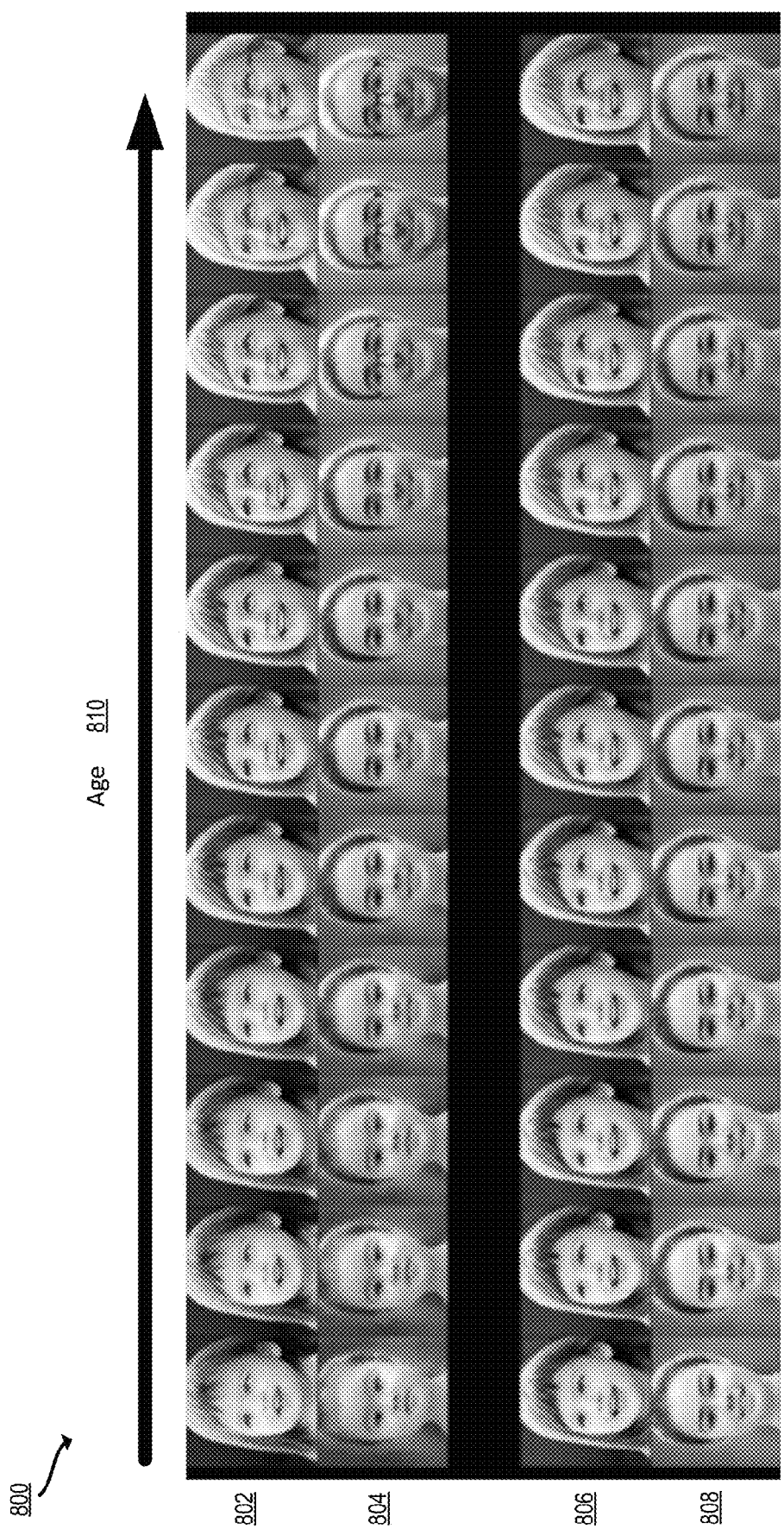
FIG. 8 depicts examples of images edited with and without the techniques of FIGS. 2A-2B according to certain embodiments of the present disclosure.

FIG. 8 illustrates an example of age editing results 800 obtained using a linear latent filter trained with and without the techniques of the present disclosure. The top rows 802 and 804 show the results of editing face images using linear latent filters trained on datasets without the decorrelation techniques of the present disclosure. Without decorrelation, glasses and beard are added to the face when age 810 is increased (increasing to the right) due to bias in the training data. Thus, the undesirable effect of inadvertently changing glasses and beard are obtained.

In contrast, the lower rows 806 and 808 show results obtained using linear latent filters trained using the decorrelation techniques described above with respect to FIGS. 2A-2B. As shown in the results in lower rows 806 and 808, unwanted changes to additional attributes are prevented using these techniques to edit the age 810, providing improved image editing.

Figure 9:
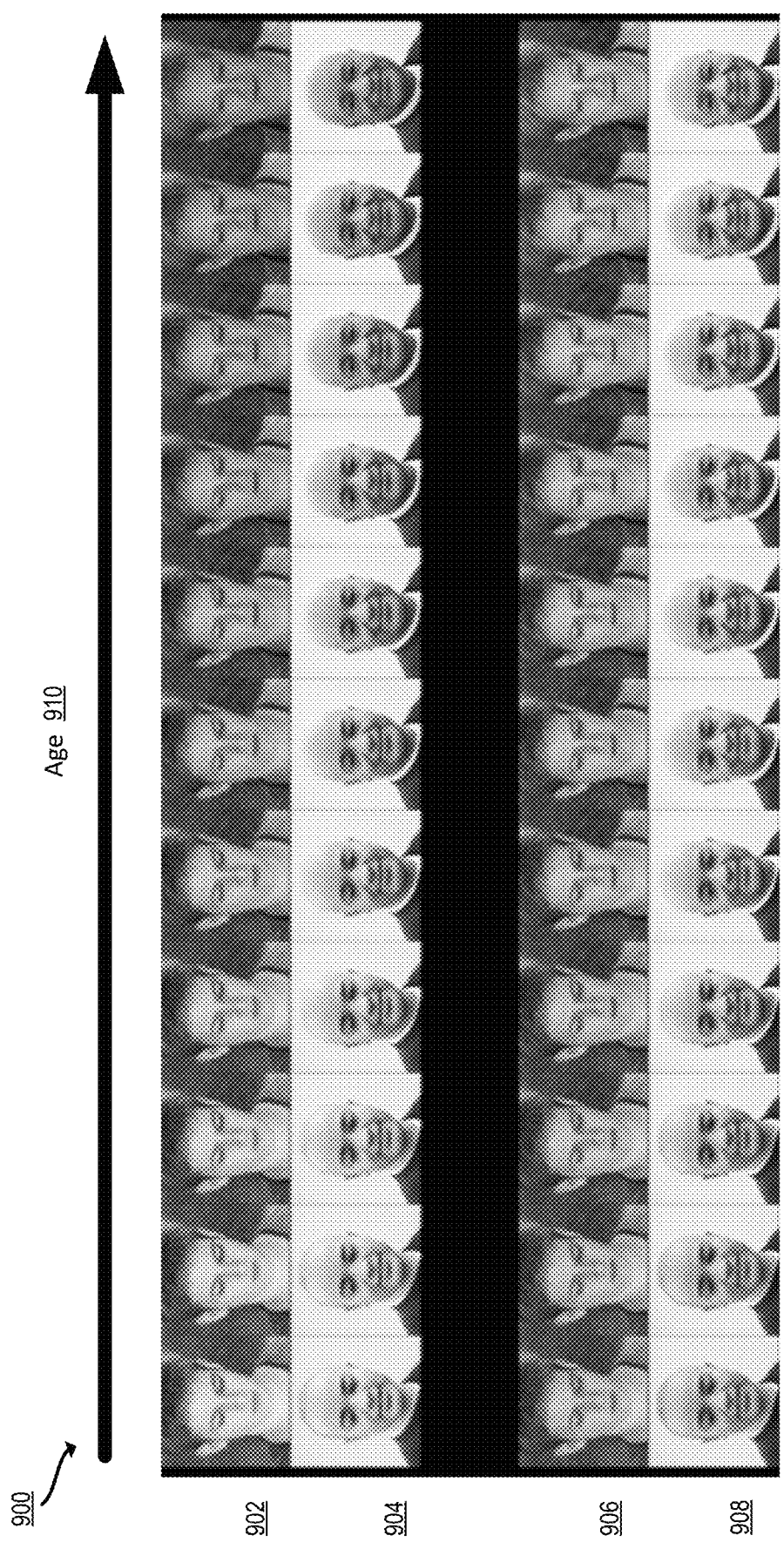
FIG. 9 depicts examples of images edited with and without the techniques of FIG. 3 according to certain embodiments of the present disclosure.

FIG. 9 illustrates examples of edited face images. The upper rows 902 and 904 show images edited by a linear latent filter for age 910. The edited faces have undesirable changes in additional attributes other than age 910, such as the skin tone becoming darker. Furthermore, in the images in the upper rows 902 and 904, nuisance factors (e.g. global lighting) that are not related to age are changed. This motivates the development of linear latent filters $n_a$ that have reduced correlation between attributes, as described herein.

In the lower rows 906 and 908, the images have been edited using a subset of the layers in the generator. Whereas the images in upper rows 902 and 904 have been edited by manipulating all layers of a StyleGAN generator, the images in lower rows 906 and 908 have been edited by manipulating a subset of layers in the StyleGAN generator (e.g., using the techniques described above with respect to FIG. 3). Whereas in the upper rows 902 and 904, when age is increased, the lighting and skin tone becomes dark, using the techniques described with respect to FIG. 3, the lighting and skin tone changes are significantly reduced, resulting in improved image editing, as shown in the examples in lower rows 906 and 908.

Example Techniques for Adaptive Range Selection for Linear Latent Filters

Figure 10:
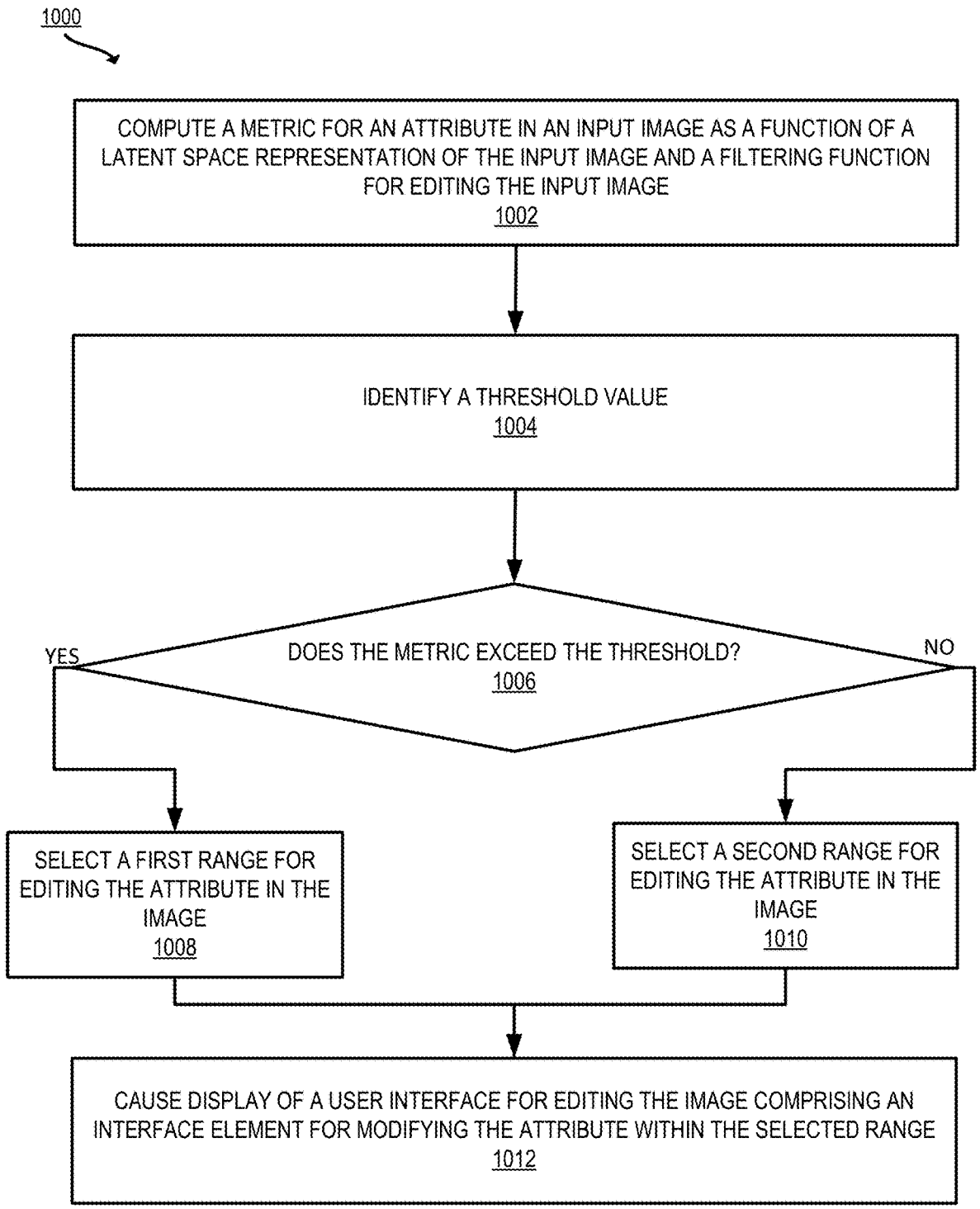
FIG. 10 depicts a flowchart of an example process for adaptive range selection for linear latent filters according to certain embodiments of the present disclosure.

FIG. 10 is a flowchart of an example process 1000 for adaptive range selection for linear latent filters. As described above, in some implementations, image editing is performed by applying a filtering vector multiplied by a scalar to control the degree of modification. In some embodiments, the range for this scalar is adaptively selected for each input image. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the processing may be performed in some different order or some steps may also be performed in parallel. In some implementations, one or more process blocks of FIG. 10 may be performed by an image editing system (e.g., the image editing system 102 of FIGS. 1A-1B). In some implementations, one or more process blocks of FIG. 10 may be performed by another device or a group of devices separate from or including the image editing system 102 (e.g., the editor interface 104 executing on a user device).

In some embodiments, at 1002, the image editing system computes a metric for an attribute in an input image as a function of a latent space representation of the input image and a filtering vector for editing the input image. This metric represents an intensity the attribute, taking into account characteristics of the image itself. The metric may further account for the features of the latent space in which the image has been projected. For example, an image of a very old or very young person will have a relatively high attribute intensity (at either end of the spectrum in the latent space), whereas an image of a person of average age will have a relatively low attribute intensity (more towards the middle of the spectrum in the latent space).

In some implementations, the range adapter evaluates a latent space representation for an input image on a trained linear classifier to identify the metric. As described above with respect to block 210 of FIG. 2A, a filtering vector $n_a$ can be generated, using a process that includes training a linear classifier on the latent space to identify how latent codes with and without a particular attribute are distributed in the latent space. This filtering vector $n_a$ represents a direction of change of the attribute a within the latent space.

Figure 11:
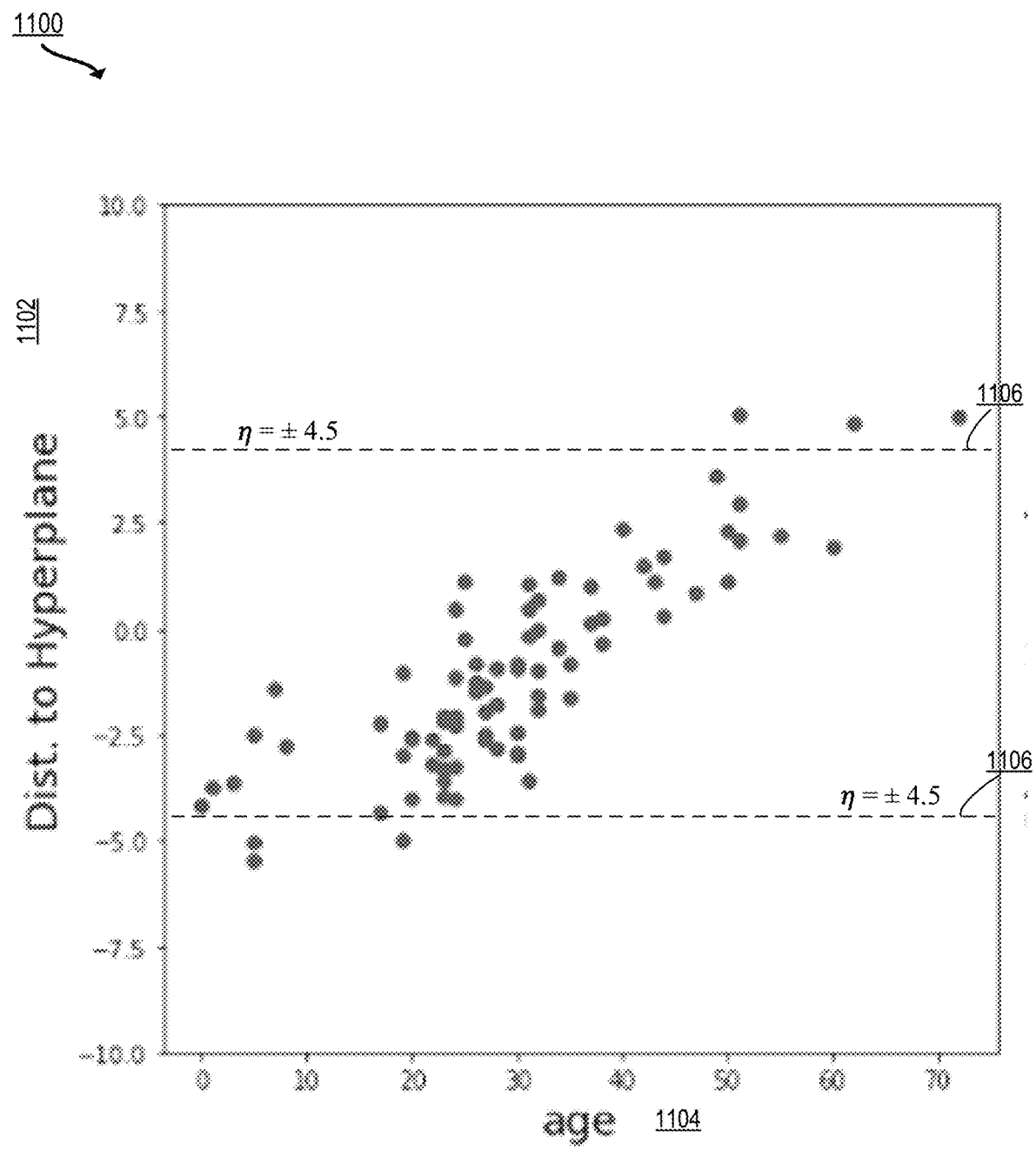
FIG. 11 depicts an example relationship between attribute value and distance to the hyperplane according to certain embodiments of the present disclosure.

The product of the latent space representation of the input image $W_p^{in}$ and the filtering vector $n_a^T$ for a particular target attribute gives information about the intensity of that attribute. Specifically, in some embodiments, the metric is equal to the scalar $n_a^T W_p^{in}$, which is the distance to the hyperplane separating images with and without a target attribute (or separating high and low attribute scores for a nonbinary attribute). The attribute intensity is a representation of the strength of the attribute in a given image. For example, for the attribute "wrinkles," the attribute intensity may range from 0 (no wrinkles) to 100 (a lot of wrinkles). Accordingly, in some embodiments, the metric is equal to $n_a^T W_p^{in}$. The inner product of the vectors $n_a^T$ and $W_p^{in}$ gives the distance to the hyperplane separating latent codes according to the distribution of the attribute a in the latent space. This metric is highly correlated to the attribute value. For example, as illustrated in FIG. 11, the distance to the hyperplane increases linearly with the value of the age attribute.

In some embodiments, at 1004, the image editing system identifies a threshold value for the attribute. For example, the range adapter performs statistical analysis of distance from hyperplane as a function of age for a set of images to determine a threshold above which there are few images. Alternatively, the range adapter analyzes distance from hyperplane versus attribute score to find a threshold near the maximum and minimum attribute scores in the data set. The threshold, η can be determined using a distance vs attribute score plot as illustrated in FIG. 11. In this example, η=±4.5 will lead to a smaller filter range for some images with relatively young or old ages. Alternatively, or additionally, an administrator can manually select a desired threshold.

In some embodiments, at 1006, the image editing system determines whether the metric exceeds the threshold. For example, the range adapter compares the metric computed at 1002 to the threshold identified at 1004 to determine which value is larger. For example, for η=4, $|n_a^T W_p^{in}|>\eta$ for the attribute intensities of 4.5, 5, −4.5, −5, and so forth, and $|n_a^T W_p^{in}|\le\eta$ for the attribute intensities of 1, 2, 3, 4, −4, −3, −2, −1, and so forth.

In some embodiments, at 1008, if the metric exceeds the threshold, then the range adapter selects a first range for editing the attribute in the image. In some implementations, the first range is smaller than the second range, to avoid increasing or decreasing the attribute intensity above or below a reasonable value.

In some embodiments, for each linear latent filter (filtering vector), the range adapter selects one of two candidate ranges $[s_1^S, s_2^S]$, and $[s_1^L, s_2^L]$, where $[s_1^S, s_2^S]$ (the first range) is a smaller range contained in $[s_1^L, s_2^L]$. For example, the smaller range may be around −1 to 1. The smaller range $[s_1^S, s_2^S]$ is selected if $$|n_a^T W_p^{in}| > \eta.$$

In some embodiments, at 1010, if the metric does not exceed the threshold, then the range adapter selects a second range for editing the attribute in the image. For example, the second range is larger than the first range (e.g., around −50 to 50). The larger range $[s_1^L, s_2^L]$ is selected if $$|n_a^T W_p^{in}| \le \eta.$$

In some implementations, whether the attribute intensity is positive or negative is further used to select a range from multiple possible ranges. For example, if $n_a^T W_p^{in}$ is negative and $|n_a^T W_p^{in}| > \eta$, then the selected range is (−1 to 50), i.e., the range is limited when decreasing the target attribute (e.g., for a young face, the age cannot be decreased much but can be increased more). If $n_a^T W_p^{in}$ is positive and $n_a^T W_p^{in} > \eta$, then the selected range is (−50 to 1), i.e., the range is limited when increasing the target attribute (e.g., for an old face, the age cannot be increased much but can be decreased more).

Accordingly, based on the correlation between attribute intensity, the latent space representation of the input image, and the filtering vector, dynamic range selection is used for each input image. This way, for example, images of faces that are old cannot be increased in age too much, and if images have a lot of hair, these images will not have an excessive amount of hair added. On the other hand, if this quantity is smaller than some threshold, e.g., age is neutral, there is more margin to edit the age attribute. In this case, a larger range is appropriate to edit the age attribute.

One or more operations in blocks 1002-1010 implement a step for selecting a range for an interface element for editing an attribute in an image based on a latent space representation of the image and a filtering vector for editing the image. For example, based on the metric computed at 1002 in comparison to a threshold at 1004 and 1006, either a first range is selected at 1008 or a second range is selected at 1010, as described above.

In some embodiments, at 1012, the image editing system 102 causes display of a user interface for editing the image comprising an interface element for editing the attribute within the selected range. For example, the image editing system transmits instructions for rendering the editor interface 104 to include slider elements (e.g., sliders 404 as illustrated in FIG. 4). The amount of modification caused by these slider elements (e.g., the range of possible values of the scalar s described above with respect to FIG. 2B) is controlled by the selected range. For example, if the first range is selected, interaction with a slider 404 can change the scalar value by an amount between −1 and +1, whereas if the second range is selected, interaction with a slider 404 can change the scalar value by an amount between −10 and +10. This adaptation of the range may or may not affect the numbers displayed on the interface itself (e.g., the scalar range can be applied on the back end when applying the linear latent filter and/or on the view shown in the editor interface 104 itself).

In some implementations, subsequent to the processing of FIG. 10, the image editing system receives user input specifying edit parameters for the attribute. For example, the attribute modifier detects user input moving a slider or other interface element in the editor interface within the selected range for a given target attribute, which indicates edit parameters including the target attribute to be edited and the edit magnitude for the target attribute, indicating how much to edit the target attribute within the bounds of the selected range. The image editing system then edits the attribute based on the specified edit parameters and the selected range (which may be already factored in to the received edit parameters or applied to the received edit parameters to rescale the modification) to generate an edited image. The image editing system causes display of the edited image in the user interface. This may be performed in a similar fashion as described above with respect to FIG. 2B.

In some implementations, process 1000 includes generating the filtering vector by obtaining training data comprising latent space representations of training images, identifying a direction in the training data corresponding to a distribution of the attribute, and generating the filtering vector as a function of the identified direction. This may be performed in a similar fashion as described above with respect to FIG. 2A.

In some implementations, process 1000 includes editing the attribute in the image by generating the filtering vector for editing the attribute in the input image, applying the filtering vector to the latent space representation of the input image according to the selected range to generate a filtered latent space representation of the image, and providing the filtered latent space representation as input to a neural network to generate an output image with a modification to the attribute. This may be performed in a similar fashion as described above with respect to FIG. 2B.

In some implementations, the neural network is a generator comprising multiple layers, and providing the filtered latent space representation as input to the neural network further comprises selecting a subset of the layers associated with the attribute, and feeding the filtered latent space representation to the selected subset of the layers. This may be performed in a similar fashion as described above with respect to FIG. 3.

In some implementations, process 1000 includes generating the latent space representation of the image by applying a machine learning model to the input image. In some implementations, the machine learning model is an encoder, and the image editing system provides the image to encoder to generate an encoded image. Alternatively, or additionally, the latent space representation is inferred through optimization. Techniques for generating a latent space representation of an input image are described above with respect to block 218 of FIG. 2B.

FIG. 11 illustrates an example plot 1100 of distance to the separating hyperplane 1102, as described above with respect to FIG. 10, versus an value of an attribute, age 1104. As shown in FIG. 11, relatively large and small ages correspond to larger distance to the hyperplane of the linear classifier. Based on this correlation, dynamic range selection is used for each input face, as described above with respect to FIG. 10.

In some embodiments, a distribution, as shown in FIG. 11, can be used to establish a threshold value. For example, based on statistical analysis such as a fixed number of standard deviations from the mean, the image editing system can select a threshold value 1106. In this example, the threshold value 1106 of $\eta = \pm 4.5$ is established so that only a few data points are beyond the threshold value 1106.

Example Techniques for Linear Latent Filters for Extending Editable Attributes

FIG. 12 is a flowchart of an example process 1200 for training and applying linear latent filters to extend the domain of editable attributes, according to some embodiments. For example, due to a lack images with angry facial expressions in standard GAN training data, it is not traditionally possible to edit the attribute "angry." The process 1200 for training and applying a linear latent filter enables editing a face image with such "uncommon" attributes, e.g., to make a face to look more or less angry. The processing depicted in FIG. 12 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 12 and described below is intended to be illustrative and non-limiting. Although FIG. 12 depicts the various processing steps occurring in a particular sequence or order, this is not intended to be limiting. In certain alternative embodiments, the processing may be performed in some different order or some steps may also be performed in parallel. In some implementations, one or more process blocks of FIG. 12 may be performed by an image editing system (e.g., the image editing system 102 of FIGS. 1A-1B). In some implementations, one or more process blocks of FIG. 12 may be performed by another device or a group of devices separate from or including the image editing system 102 (e.g., the editor interface 104 executing on a user device).

In some embodiments, at 1202, the image editing system obtains a first training data set comprising latent space representations of multiple training images. For example, the training subsystem of the image editing system may retrieve training images from a dataset of images of interest. As a specific example, for face editing, face training images can be retrieved from a face image dataset such as Flickr-Faces-HQ (FFHQ). As additional examples, for editing pictures of shoes or landscapes, the training subsystem retrieves the training images from appropriate datasets such as a data set of shoe images (e.g., a set of online catalogs) or a data set of landscape images.

The training subsystem may then generate latent space representations of the image data. This may be performed by encoding the images using a neural network and/or optimizing the latent code, as described above with respect to block 218 of FIG. 2B. In some implementations, the training subsystem further map the encoded images to W space and/or augment the mapped encoded image to $W_p$ space, as described above with respect to block 218 of FIG. 2B. Alternatively, or additionally, the training subsystem may retrieve latent space representations generated by another system (e.g., StyleGAN latent training data).

In some embodiments, at 1204, the image editing system generates a second training data set by querying an external database to retrieve a set of training images including an attribute that is uncommon in the first training data set and generating latent space representations of the training images with the attribute that is uncommon in the first training data set. An attribute is uncommon in a data set if it is not present or present in relatively small numbers (e.g., less than 5% or less than 1% of the data has that attribute) in the data set. As a specific example, there are less than 50 angry face images out of 500,000 samples of the StyleGAN training data set, so angry is an uncommon attribute in that data set. Other examples of attributes that are uncommon in typical face image training data sets include a surprised expression, a crying expression, bindis, and tattoos. Similarly, for training data sets based on images of shoes, attributes such as the color pink or fur fabric are uncommon attributes.

The training subsystem acquires training data including such attributes that are uncommon in the first data set. In some implementations, the training subsystem obtains the second training data set by querying an image repository that includes images with the uncommon attribute. As a specific example, the training subsystem retrieves a set of stock photos from a repository such as Adobe® Stock. As another example, the training subsystem retrieves images from a Web image search for that attribute (e.g., searching for angry face images or pink shoe images).

In some implementations, the training subsystem generates the latent space representations of the input images with the attribute that is uncommon in the first data set by, for each training image of the retrieved set of training images with the attribute that is uncommon in the first data set, applying a machine learning model to the training image. This may be performed using an encoder and/or optimizer, as described above with respect to block 218 of FIG. 2B. In some implementations, the training subsystem further maps the encoded image to W space and/or augments the mapped encoded image to $W_p$ space, as described above with respect to block 218 of FIG. 2B.

In some embodiments, at 1206, the training subsystem combines the first data set and the second data set to generate combined training data. For example, the training subsystem stores both the first data set and the second data set together to the data storage unit 141. Alternatively, or additionally, the training subsystem generates pointers or other instructions to retrieve both data sets for the training process, potentially from different storage units.

In some embodiments, at 1208, the training subsystem uses the combined training data to train a filtering vector for editing the attribute that is uncommon in the first training data set. For example, the training subsystem may identify a direction in the combined training data corresponding to a distribution of the attribute that is uncommon in the first training data set to generate the filtering vector. This may be performed in a similar fashion as described above with respect to block 210 of FIG. 2A, using the combined training data enriched with the latent space representations of images including the uncommon attribute.

In some embodiments, at 1210, the training subsystem applies the filtering vector to an input image to edit the attribute that is uncommon in the first training data set. For example, the training subsystem obtains a latent space representation of the input image, applies the filtering vector to the latent space representation of the input image to generate a filtered latent space representation of the input image, and provides the filtered latent space representation as input to a neural network to generate an output image with a modification to the attribute that is uncommon in the first training data set. This may be performed in a similar fashion as described above with respect to FIG. 2B.

In some implementations, the neural network is a generator comprising multiple layers. Providing the filtered latent space representation to the neural network includes selecting a subset of the layers associated with the attribute, and feeding the filtered latent space representation to the selected subset of the layers. This may be performed in a similar fashion as described above with respect to FIG. 3.

In some implementations, process 1200 includes causing display of a user interface comprising an interactive component configured to control the attribute that is uncommon in the first training data set. The image editing system receives input specifying a modification to the attribute that is uncommon in the first training data set. The image editing system applies the filtering vector based on the modification. This may be performed in a similar fashion as described above with respect to FIG. 2B (i.e., using an edit attribute and edit magnitude received by the projection subsystem from the edit management subsystem based on edit parameters received via the editor interface to edit the image).

Using the process 1200, the image editing system trains the filtering vector using an integrated data set including images with an attribute that is uncommon in the first training data set such as an angry facial expression or a landscape with a volcano eruption. While prior approaches fail to find proper linear latent filters for such uncommon attributes due to biases in the training data, the techniques of FIG. 12 can address these biases and generate linear latent filters that accurately edit uncommon attributes.

Figure 13:
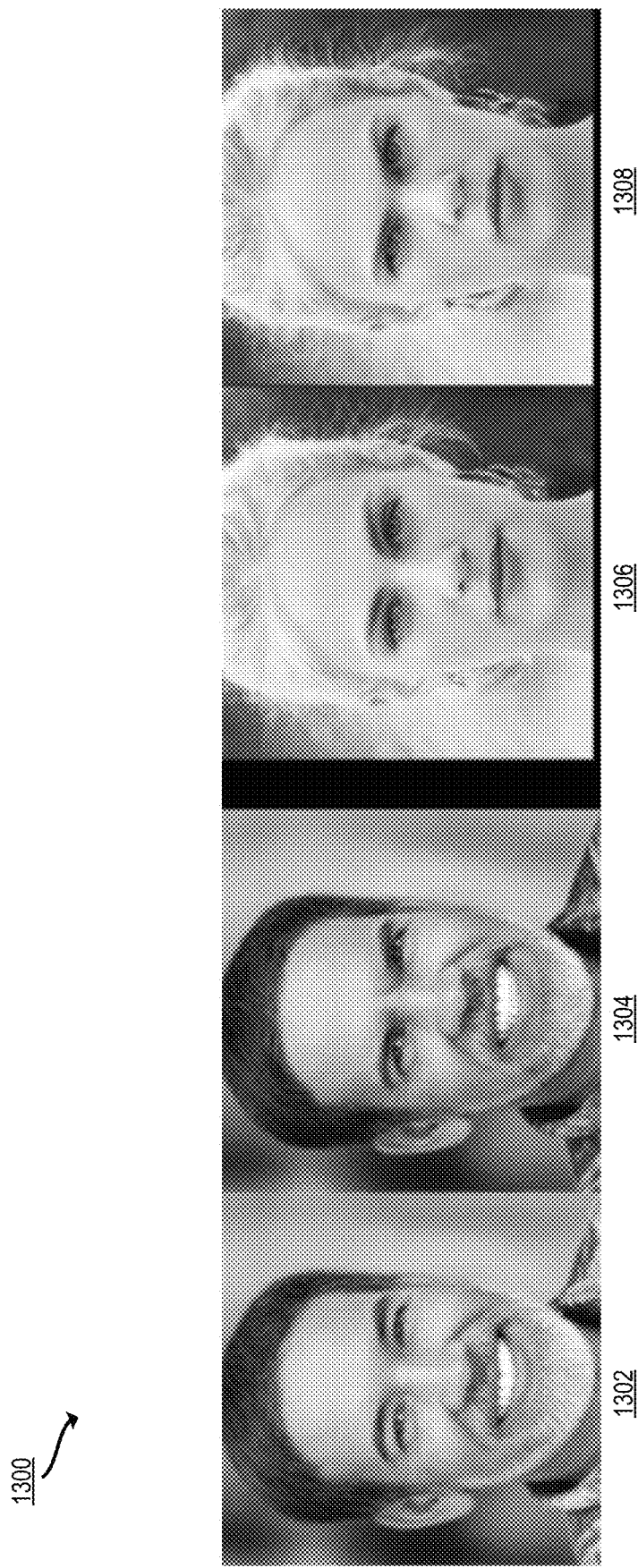
FIG. 13 depicts examples of images edited using the techniques of FIG. 12 according to certain embodiments of the present disclosure.

FIG. 13 illustrates example face editing results 1300 using filtering vectors for uncommon attributes trained using the techniques described above with respect to FIG. 12. First input image 1302 is a face with a smiling expression. First output image 1304 is the result of applying a linear latent filter trained using the techniques of FIG. 12 to the first input image 1302 to change the expression to angry (an uncommon attribute in facial image sets traditionally used for training data). Second input image 1306 is a face with a neutral expression. Second output image 1308 is the result of a linear latent filter trained using the techniques of FIG. 12 applied to the second input image 1306 to change the expression to angry.

Use of linear latent filters is advantageous in that the latent space $W_p$ allows high-fidelity, high-resolution (e.g., 1024× 1024) and continuous facial attributes editing using linear latent filters. Use of linear latent filters in the latent space has a relatively fast running time, which provides a fluidic user experience. While reduced attribute control is common in prior systems (e.g., because changing smile will inadvertently change gender), using the techniques of the processes 200A-200B, 300, 1000, and 1200, linear latent filters can be applied to independently control a target attribute without sacrificing speed, continuity, or high resolution results.

Example of a Computing System for GAN Based Image Processing

Any suitable computing system or group of computing systems can be used for performing the operations described herein. For example, FIG. 14 depicts examples of computing system 1400 that executes an image editing system 102 that includes an edit management subsystem 120 for performing image processing as described herein. In some embodiments, the computing system 1400 also executes a projection subsystem 110 for performing latent space projection as described herein, an image generation subsystem 130 for performing image generation as described herein, a training subsystem 140 for performing machine learning model training as described herein, and an editor interface 104 for controlling input and output to configure image edits as described herein. In other embodiments, a separate computing system having devices similar to those depicted in FIG. 14 (e.g., a processor, a memory, etc.) executes one or more of the subsystems 110-140 and the editor interface 104.

The depicted examples of a computing system 1400 includes a processor 1402 communicatively coupled to one or more memory devices 1404. The processor 1402 executes computer-executable program code stored in a memory device 1404, accesses information stored in the memory device 1404, or both. Examples of the processor 1402 include a microprocessor, an application-specific integrated circuit ("ASIC"), a field-programmable gate array ("FPGA"), or any other suitable processing device. The processor 1402 can include any number of processing devices, including a single processing device.

The memory device 1404 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1400 may also include a number of external or internal devices, such as input or output devices. For example, the computing system 1400 is shown with one or more input/output ("I/O") interfaces 1408. An I/O interface 1408 can receive input from input devices or provide output to output devices. One or more buses 1406 are also included in the computing system 1400. The bus 1406 communicatively couples one or more components of a respective one of the computing system 1400.

The computing system 1400 executes program code that configures the processor 1402 to perform one or more of the operations described herein. The program code includes, for example, the image editing system 102, including the projection subsystem 110, the edit management subsystem 120, the image generation subsystem 130, the training subsystem 140, the editor interface 104, or other suitable applications that perform one or more operations described herein. The program code may be resident in the memory device 1404 or any suitable computer-readable medium and may be executed by the processor 1402 or any other suitable processor. In some embodiments, the projection subsystem 110, the edit management subsystem 120, the image generation subsystem 130, the training subsystem 140, and the editor interface 104 are stored in the memory device 1404, as depicted in FIG. 14. In additional or alternative embodiments, one or more of the image the projection subsystem 110, the edit management subsystem 120, the image generation subsystem 130, the training subsystem 140, and the editor interface 104 are stored in different memory devices of different computing systems. In additional or alternative embodiments, the program code described above is stored in one or more other memory devices accessible via a data network.

The computing system 1400 can access data in any suitable manner. In some embodiments, some or all of one or more of these data sets, models, and functions are stored in the memory device 1404, as in the example depicted in FIG. 14. For example, a computing system 1400 that executes the training subsystem 140 can access training data stored by an external system.

In additional or alternative embodiments, one or more of these data sets, models, and functions are stored in the same memory device (e.g., one of the memory devices 1404). For example, a common computing system can host the edit management subsystem 120 and the training subsystem 140 as well as the training data. In additional or alternative embodiments, one or more of the programs, data sets, models, and functions described herein are stored in one or more other memory devices accessible via a data network.

The computing system 1400 also includes a network interface device 1410. The network interface device 1410 includes any device or group of devices suitable for establishing a wired or wireless data connection to one or more data networks. Non-limiting examples of the network interface device 1410 include an Ethernet network adapter, a modem, and the like. The computing system 1400 is able to communicate with one or more other computing devices (e.g., a computing device executing the editor interface 104 as depicted in FIG. 1A) via a data network using the network interface device 1410.

In some embodiments, the functionality provided by the computing system 1400 may be offered via a cloud-based service provided by a cloud infrastructure 1500 provided by a cloud service provider. For example, FIG. 15 depicts an example of a cloud infrastructure 1500 offering one or more services including image editing software as-a-service 1504 that offers image editing functionality as described in this disclosure. Such a service can be subscribed to and used by a number of user subscribers using user devices 1510A, 1510B, and 1510C across a network 1508. The service may be offered under a Software as a Service (SaaS) model. One or more users may subscribe to such as service.

In the embodiment depicted in FIG. 15, the cloud infrastructure 1500 includes one or more server computer(s) 1502 that are configured to perform processing for providing one or more services offered by the cloud service provider. One or more of server computer(s) 1502 may implement a projection subsystem 110, edit management subsystem 120, image generation subsystem 130, and training subsystem 140, as depicted in FIG. 14. The subsystems 110-140 may be implemented using software only (e.g., code, program, or instructions executable by one or more processors provided by cloud infrastructure 1500), in hardware, or combinations thereof. For example, one or more of the server computer(s) 1502 may execute software to implement the services and functionalities provided by subsystems 110-140, where the software, when executed by one or more processors of the server computer(s) 1502, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1502 can include volatile memory, non-volatile memory, or a combination thereof.

In the embodiment depicted in FIG. 15, cloud infrastructure 1500 also includes a network interface device 1506 that enables communications to and from cloud infrastructure 1500. In certain embodiments, the network interface device 1506 includes any device or group of devices suitable for establishing a wired or wireless data connection to the network 1508. Non-limiting examples of the network interface device 1506 include an Ethernet network adapter, a modem, and/or the like. The cloud infrastructure 1500 is able to communicate with the user devices 1510A, 1510B, and 1510C via the network 1508 using the network interface device 1506.

An editor interface (e.g., editor interface 104A, editor interface 104B, and editor interface 104C) may be displayed on each of the user devices user device A 1510A, user device B 1510B, and user device C 1510C. A user of user device 1510A may interact with the displayed editor interface, for example, to enter an input image and/or image edit parameters. In response, processing for image processing may be performed by the server computer(s) 1502.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
   computing a metric for an attribute in an input image as a function of a latent space representation of the input image and a filtering vector for editing the input image;
   comparing the metric to a threshold;
   if the metric exceeds the threshold, selecting a first range for editing the attribute in the input image;
   if the metric does not exceed the threshold, selecting a second range for editing the attribute in the input image; and
   causing display of a user interface for editing the input image comprising an interface element for editing the attribute within the selected range.

2. The method of claim 1, further comprising:
   receiving user input specifying edit parameters for the attribute;
   editing the attribute based on the specified edit parameters and the selected range to generate an edited image; and
   causing display of the edited image in the user interface.

3. The method of claim 1, wherein the first range is smaller than the second range.

4. The method of claim 1, further comprising generating the filtering vector by:
   obtaining training data comprising latent space representations of training images;
   identifying a direction in the training data corresponding to a distribution of the attribute; and
   generating the filtering vector as a function of the identified direction.

5. The method of claim 1, further comprising editing the attribute in the input image by:
   generating the filtering vector for editing the attribute in the input image;
   applying the filtering vector to the latent space representation of the input image according to the selected range to generate a filtered latent space representation of the input image; and
   providing the filtered latent space representation of the input image as input to a neural network to generate an output image with an edit to the attribute.

6. The method of claim 5, wherein the neural network is a generator comprising a plurality of layers, and wherein providing the filtered latent space representation as input to the neural network further comprises:
   selecting a subset of the layers associated with the attribute; and
   feeding the filtered latent space representation to the selected subset of the layers.

7. The method of claim 1, further comprising generating the latent space representation of the input image by applying a machine learning model to the input image.

8. A non-transitory computer-readable medium having instructions stored thereon, the instructions executable by a processing device to perform operations comprising:
   a step for selecting a range for an interface element for editing an attribute in an input image based on a latent space representation of the input image and a filtering vector for editing the input image; and
   causing display of a user interface for editing the image comprising the interface element with the selected range.

9. The non-transitory computer-readable medium of claim 8, the operations further comprising:
   receiving user input specifying edit parameters for the attribute;
   editing the attribute based on the specified edit parameters to generate an edited image; and
   causing display of the edited image in the user interface.

10. The non-transitory computer-readable medium of claim 8, wherein a smaller range is selected if the metric computed based on the latent space representation and the filtering vector exceeds a threshold.

11. The non-transitory computer-readable medium of claim 8, wherein the filtering vector is generated by:
    obtaining training data comprising latent space representations of training images;
    identifying a direction in the training data corresponding to a distribution of the attribute; and
    generating the filtering vector as a function of the identified direction.

12. The non-transitory computer-readable medium of claim 8, further comprising editing the attribute in the image by:
    generating the filtering vector for editing the attribute in the image;
    applying the filtering vector to the latent space representation of the image according to the selected range to generate a filtered latent space representation of the image; and
    providing the filtered latent space representation as input to a neural network to generate an output image with a modification to the attribute.

13. The non-transitory computer-readable medium of claim 12, wherein the neural network is a generator comprising a plurality of layers, and wherein providing the filtered latent space representation as input to the neural network further comprises:
    selecting a subset of the layers associated with the attribute; and
    feeding the filtered latent space representation to the selected subset of the layers.

14. The non-transitory computer-readable medium of claim 8, further comprising generating the latent space representation of the image by applying a machine learning model to the input image.

* * * * *